United States Patent
Rippe et al.

(10) Patent No.: US 12,533,118 B2
(45) Date of Patent: Jan. 27, 2026

(54) INTERNAL FIBULA SLING

(71) Applicant: GLOBUS MEDICAL, INC., Audubon, PA (US)

(72) Inventors: Bradford H. Rippe, Philadelphia, PA (US); Zachary Shiner, Philadelphia, PA (US); Keiichi Matsuda, London (GB); James A. Gault, Philadelphia, PA (US)

(73) Assignee: Globus Medical, Inc., Audubon, PA (US)

( * ) Notice: Subject to any disclaimer, the term of this patent is extended or adjusted under 35 U.S.C. 154(b) by 589 days.

(21) Appl. No.: 16/941,629

(22) Filed: Jul. 29, 2020

(65) Prior Publication Data

US 2022/0031301 A1    Feb. 3, 2022

(51) Int. Cl.
*A61B 17/04*    (2006.01)
*A61B 17/68*    (2006.01)

(52) U.S. Cl.
CPC ........ *A61B 17/0401* (2013.01); *A61B 17/683* (2013.01); *A61B 2017/0414* (2013.01); *A61B 2017/0453* (2013.01); *A61B 2017/0496* (2013.01)

(58) Field of Classification Search
CPC ............ A61B 17/0401; A61B 17/0487; A61B 17/0466; A61B 17/683; A61B 17/8061; A61B 17/842; A61B 2017/0403; A61B 2017/0404; A61B 2017/0406; A61B 2017/0408; A61B 2017/0412; A61B 2017/0414; A61B 2017/0427; A61B 2017/044; A61B 2017/0445; A61B 2017/0496; A61B 2017/0454

See application file for complete search history.

(56) References Cited

U.S. PATENT DOCUMENTS

| | | | |
|---|---|---|---|
| 5,643,321 A | 7/1997 | McDevitt | |
| 5,849,004 A | 12/1998 | Bramlet | |
| 6,423,065 B2 * | 7/2002 | Ferree | A61B 17/7058 606/308 |
| 6,932,834 B2 | 8/2005 | Lizardi et al. | |
| 7,955,388 B2 * | 6/2011 | Jensen | A61B 17/8685 623/13.14 |
| 8,114,135 B2 * | 2/2012 | Malandain | A61B 17/7062 606/279 |
| 8,821,541 B2 * | 9/2014 | Dreyfuss | A61B 17/8645 606/232 |
| 8,882,801 B2 * | 11/2014 | DiMatteo | A61B 17/0401 606/232 |
| 9,364,210 B2 | 6/2016 | Gregoire et al. | |
| 9,855,028 B2 | 1/2018 | Vijay et al. | |

(Continued)

FOREIGN PATENT DOCUMENTS

| | | | |
|---|---|---|---|
| JP | 2009101142 A | 5/2009 | |
| JP | 2009522065 A | 6/2009 | |

(Continued)

*Primary Examiner* — Dianne Dornbusch

(57) ABSTRACT

Syndesmotic fixation devices, systems, instruments, and methods thereof. An implant for stabilizing an ankle joint between a tibia and a fibula may include first and second anchors secured to the tibia and a suture configured to wrap around the fibula. The suture may be tensioned to provide a circumferential force around the fibula to stabilize the joint.

12 Claims, 22 Drawing Sheets

(56) References Cited

U.S. PATENT DOCUMENTS

| | | | |
|---|---|---|---|
| 10,213,292 B2 | 2/2019 | Arai et al. | |
| 10,327,826 B2 | 6/2019 | Horrell et al. | |
| 10,426,459 B2 | 10/2019 | Fallin et al. | |
| 10,433,890 B2 | 10/2019 | Golden et al. | |
| 10,470,808 B2 | 11/2019 | Golden et al. | |
| 10,492,775 B2 | 12/2019 | Vijay et al. | |
| 10,582,920 B2 | 3/2020 | Lunn et al. | |
| 2004/0127907 A1* | 7/2004 | Dakin | A61B 17/842 606/103 |
| 2004/0153153 A1* | 8/2004 | Elson | A61F 2/0811 606/322 |
| 2006/0282081 A1 | 12/2006 | Fanton et al. | |
| 2009/0043337 A1* | 2/2009 | Martin | A61B 17/0401 606/301 |
| 2009/0076545 A1* | 3/2009 | DiMatteo | A61B 17/0401 606/232 |
| 2009/0157124 A1 | 6/2009 | Ferragamo et al. | |
| 2010/0179573 A1* | 7/2010 | Levinsohn | A61B 17/0401 606/232 |
| 2010/0331896 A1* | 12/2010 | Le Couedic | A61B 17/0401 606/305 |
| 2014/0194907 A1* | 7/2014 | Bonutti | A61B 17/0401 606/151 |
| 2015/0039029 A1 | 2/2015 | Wade | |
| 2015/0051601 A1* | 2/2015 | Larsen | A61B 17/0401 606/74 |
| 2015/0073475 A1* | 3/2015 | Schaller | A61F 2/0811 606/232 |
| 2015/0289917 A1* | 10/2015 | Wotton, III | A61B 17/0401 606/304 |
| 2019/0069890 A1 | 3/2019 | Moore et al. | |
| 2019/0167254 A1 | 6/2019 | Balboa et al. | |
| 2019/0350629 A1 | 11/2019 | Larsen et al. | |
| 2019/0374268 A1 | 12/2019 | Golden et al. | |
| 2019/0380695 A1 | 12/2019 | Fallin et al. | |
| 2020/0085423 A1 | 3/2020 | Vijay et al. | |
| 2020/0170696 A1* | 6/2020 | Haber | A61B 17/809 |

FOREIGN PATENT DOCUMENTS

| | | |
|---|---|---|
| JP | 2016530001 A | 9/2016 |
| JP | 2018509276 A | 4/2018 |
| WO | 2016154550 A1 | 9/2016 |

* cited by examiner

FIG. 2B  FIG. 2C

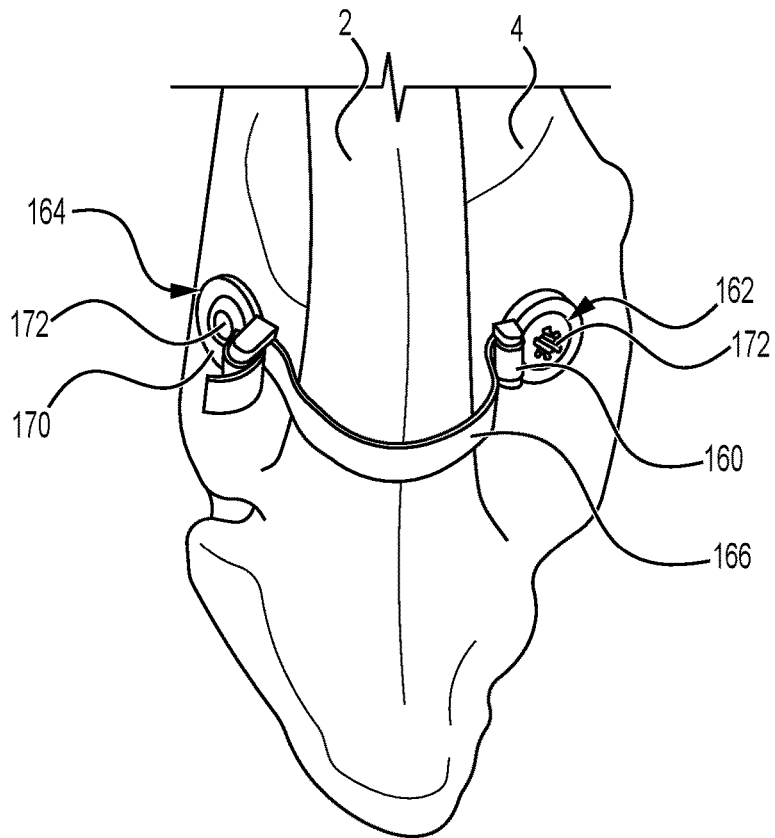
FIG. 14A
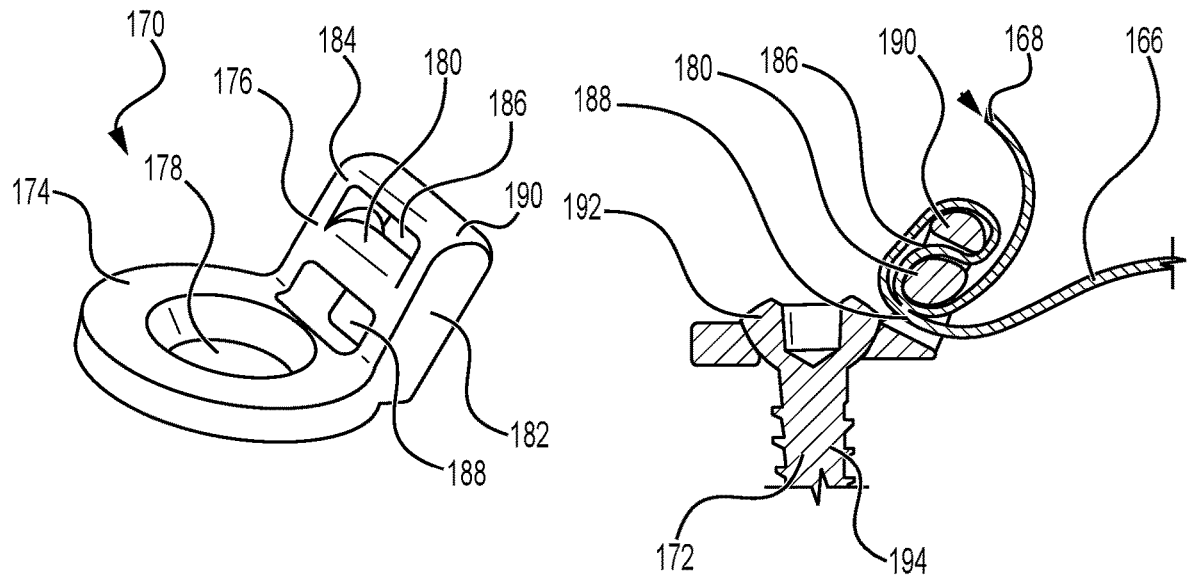
FIG. 14B  FIG. 14C

INTERNAL FIBULA SLING

FIELD OF THE INVENTION

The present application relates generally to surgical devices, and more particularly, stabilization systems, for example, for trauma applications.

BACKGROUND OF THE INVENTION

Syndesmotic joints are a type of joint between parallel bones connected by fibrous tissue and having limited motion (e.g., between the fibula and tibia at the ankle). Syndesmotic injury may occur in patients who sustain ankle sprains or ankle fractures, for example. Syndesmosis fixation may be used to stabilize an unstable syndesmotic joint injury. Existing syndesmosis fixation may include metal syndesmotic screws or suture buttons.

With metallic syndesmotic screws, holes may be drilled entirely through the fibula and typically through the tibia. The screws are placed across the joint, which may limit normal anatomic motion. The screws may be removed at about 90 days post-op or may break. Some surgeons opt to leave them in, willingly allowing them to break. Screw holes in the fibula may lead to stress fractures of the fibula, for example, in cases where the holes are improperly placed or the patient has very poor bone quality.

With suture button constructs, holes may be drilled entirely through the fibula and tibia. The metallic suture buttons may be located on the lateral side of the fibula and the medial side of the tibia and are connected through the bone by a suture. The drill holes may lead to stress fractures in the fibula, and the buttons may cause tissue irritation and pain. The sutures may break or the buttons may subside into the bone causing loss of fixation.

In each of these methods, the fibula is being constrained relative to the tibia, and the position in which it is reduced is heavily dependent on the surgeon's choice of implant position. Reductions that do not restore the fibula to its normal anatomical position may cause degenerative ankle issues for the patient. Also, holes are drilled through the fibula and tibia, which if done poorly or in osteoporotic bone may cause stress fractures. Additionally, due to the force vectors at play, these fixation methods may produce a mal-reduced syndesmosis. Mal-reductions may be linked to poor clinical outcomes and further degeneration of the ankle joint. Thus, there is a need for syndesmotic fixation systems that provide stabilization while eliminating many of the concerns with the existing devices and methods.

SUMMARY OF THE INVENTION

To meet this and other needs, devices, systems, instruments, and methods of bone stabilization are provided. The stabilization systems may include a method of fixation where a suture, band, or tether wraps around one bone (e.g., the fibula) and is secured into another bone (e.g., the tibia). Unlike injuries treated with screws or suture button systems, which are placed through the fibula and into the syndesmosis, the implants do not go through the fibula. Instead, the implant may attach to the anterior and posterior sides of the tibia and the suture wraps around the fibula to hold the syndesmosis stable. In this manner, no holes are drilled into the fibula, and the suture stabilizes the joint. Although described with reference to the tibia and fibula, it will be appreciated that the stabilization system is suitable for other bones or joints.

According to one embodiment, an implant for stabilizing a joint between a tibia and a fibula includes first and second anchors and a suture. The first anchor may be configured to be inserted into a posterior aspect of the tibia. The second anchor may be configured to be inserted into an anterior aspect of the tibia. The suture may be configured to wrap around the fibula. A first end of the suture is securable by the first anchor and a second end of the suture is securable by the second anchor. The suture may be configured to be tensioned to provide a circumferential force around the fibula, thereby stabilizing the joint. For example, the first posterior anchor may be a static anchor and the second anterior anchor may be a tensioning anchor. The suture may be positioned against bare bone or may be positioned above or below a fibula plate, for example.

In one embodiment, the anchor includes a cannulated body extending from a proximal end to a distal end. The distal end includes a buckle configured to secure and tension the suture. The buckle is integrated with the body and includes a cross-member positioned between opposing side members. The buckle defines a first opening and a second opening on opposite sides of the cross-member. The suture may extend through the cannulated body into the second opening of the buckle and loop around the cross-member into the first opening to secure the suture to the anchor and allow tensioning of the suture.

According to one embodiment, the anchor includes a pair of deployable wings and an actuator configured to deploy the wings and crimp down on the suture. Each of the deployable wings may be pivotably connected to the body of the anchor with a pivot pin. The deployable wings may have a collapsed position where the wings are positioned against the body, and an extended position where the wings are extended outwardly away from the body of the anchor. The actuator may be configured to engage with a cam surface along an inner portion of each wing. As the actuator translates forward, the actuator may slide against the cam surfaces, thereby pivoting the wings into the extended position. After the suture is passed through a suture opening in the body of the anchor, and when the actuator is advanced forward, the actuator may crimp down on the suture. The anchor may include a plurality of barbs along the body of the anchor. The body may include a suture path devoid of barbs such that the suture may rest alongside and/or within the body of the anchor.

In one embodiment, the anchor includes an assembly including a buckle washer with an integrated buckle and a bone screw positionable through the washer. The buckle washer may include a washer with a central hole extending therethrough, and the buckle may protrude from the washer. The buckle may be a slide buckle or tri-glide adjuster, for example. The suture may loop around the buckle to secure and allow for tensioning of the suture.

According to one embodiment, the anchor includes an assembly having a cam washer with a moveable cam and a bone screw positionable through the washer. The moveable cam may include an opening for receiving the suture. The moveable cam may act as a one-way tensioner, which allows for the free movment of the suture in one position and for locking of the suture at a desired tension at another position.

In one embodiment, the anchor includes a body with a buckle configured to secure and tension the suture at its proximal end. The buckle may be integrated with the body, and the suture may loop around the buckle to secure the suture to the anchor and allow for tensioning of the suture.

According to another embodiment, an implant for stabilizing a joint between a first bone and a second bone may include a static anchor, a tensioning anchor, and a suture. The static anchor and the tensioning anchor may be configured to engage the first bone. The tensioning anchor may include a body with a suture opening extending therethrough, a pair of deployable wings on opposite sides of the body, and an actuator configured to extend the deployable wings. The suture may be configured to wrap around the second bone. A first end of the suture may be secured by the static anchor and a second end of the suture may be secured by the tensioning anchor. The suture may be configured to be tensioned to stabilize the joint.

According to yet another embodiment, a method for stabilizing a joint between a tibia and a fibula may include inserting a static anchor into a posterior aspect of the tibia where a suture is permanently affixed to the static anchor; positioning a free end of the suture through a tensioning anchor; wrapping the suture around the fibula; inserting the tensioning anchor into an anterior aspect of the tibia; and applying a tension to the suture, thereby stabilizing the fibula and tibia. Either or both of the anchors may be positioned sub-flush beneath cortical bone of the tibia.

According to another embodiment, a suture passer instrument may include a body with prongs configured to hold an inserter instrument and a loop of wire extending from the body of the suture passer. The suture may be positioned through the tensioning anchor with the suture passer. For example, the loop of wire may be positionable through an opening in the tensioning anchor, and after the free end of suture is passed through the loop of wire, the passer may be removed from the anchor such that the loop of wire pulls the suture through the opening.

According to another embodiment, an inserter may include an outer shaft configured to connect to the anchor, an inner shaft positionable through the outer shaft and configured to rotate the actuator of the anchor, and a tensioner assembly with a plate defining a plurality of slits and a rotatable handle for translating the plate. Tension may be applied to the suture with the inserter by winding the suture around the plate between the slits, and rotating the handle to translate the plate proximally and away from the anchor. A knob connected to the inner shaft may be rotated to crimp down the actuator onto the suture to lock the suture in place.

According to another embodiment, a targeting guide includes a base configured to engage with the fibula (or a plate), a hook extending from the base configured to hook on to the end of the fibula, a first arm with a first guide opening for receiving a first aiming sleeve targeting an anterior drill location on the tibia (e.g., for the anterior anchor), and a translatable second arm with a second guide opening for receiving a second aiming sleeve targeting a posterior drill location on the tibia (e.g., for the posterior anchor).

Also provided is a kit including one or more implants, anchors, sutures, inserters, suture passers, targeting guides, k-wires, and other components for performing the procedure.

BRIEF DESCRIPTION OF THE DRAWINGS

A more complete understanding of the present invention, and the attendant advantages and features thereof, will be more readily understood by reference to the following detailed description when considered in conjunction with the accompanying drawings, wherein:

FIGS. 2A-2D show an embodiment of a tensioning anchor;

FIGS. 14A-14E show an embodiment of a fibula sling stabilization system including a pair of anchors systems attachable to the tibia and a suture configured to loop around and stabilize the fibula;

DETAILED DESCRIPTION OF THE INVENTION

Embodiments of the disclosure are generally directed to devices, systems, instruments, and methods for bone stabilization. Specifically, embodiments are directed to stabilization systems including first and second anchors or assemblies configured to be secured in the tibia and a suture that wraps around the fibula, which supports and stabilizes the fibula relative to the tibia. The fibula sling stabilization system eliminates the need to drill any holes through the fibula, thereby minimizing the likelihood of stress fractures in the fibula, lessening irritation and pain, and/or reducing the chance for degenerative ankle issues for the patient.

Additional aspects, advantages and/or other features of example embodiments of the invention will become apparent in view of the following detailed description. It should be apparent to those skilled in the art that the described embodiments provided herein are merely exemplary and illustrative and not limiting. Numerous embodiments of modifications thereof are contemplated as falling within the scope of this disclosure and equivalents thereto.

Although the system is described with reference to stabilizing the fibula relative to the tibia, it will be appreciated that the system may be used for other joints or bones in the body. For example, the device may be adapted to stabilize one or more of a femur, a humerus, a clavicle, an ulna, a radius, bones of the foot, bones of the hand, or other suitable bone or bones.

Figure 1:
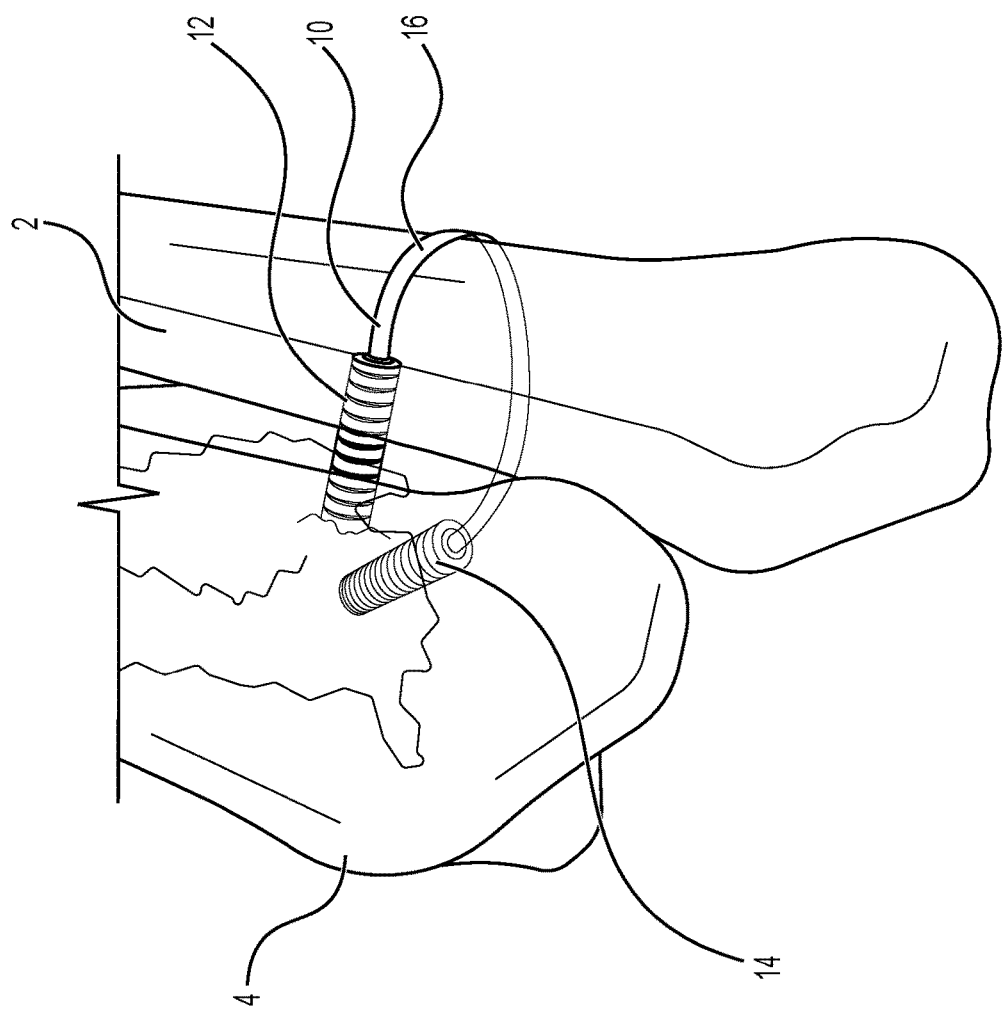
FIG. 1 shows an embodiment of a fibula sling stabilization system including a posterior and anterior anchors attached to the tibia, and a suture connecting the anchors, which loops around the fibula.

Referring now to FIG. 1, an ankle joint is shown including the distal fibula 2 and distal tibia 4. In one embodiment, the ankle joint is configured to be stabilized with a stabilization system 10 including a posterior anchor 12, an anterior anchor 14, and a tether, band, or suture 16 connecting the posterior and anterior anchors 12, 14. The suture 16 wraps around the fibula 2 to stabilize the fibula 2 and tibia 4. The posterior and anterior anchors 12, 14 may be positioned fully sub-flush beneath the cortical bone of the tibia 4. The suture 16 connecting the two anchors 12, 14 may be wrapped around the bare fibula 2 (as shown) or may go above or below a fibula plate.

With further reference to FIGS. 2A-2D, anchor 12, 14 is shown. The posterior and anterior anchors 12, 14 may be the same or different. In this embodiment, the posterior and anterior anchors 12, 14 are the same and will be described with reference to anchor 12, which applies equally to anchor 14. The anchor 12 may have a body 20 extending from a first end 22 to a second 24. The body 20 may be cannulated such that a channel 28 extends through the body 20. The first end 22 may be a proximal end and may include a recess 26 configured to receive an instrument 18 for inserting the anchor 12. The second end 24 may be a distal end configured to be inserted into bone (e.g., the tibia 4). The second end 24 may have a distal tip that is blunt, but may be configured to be pointed or otherwise configured to engage bone.

The anchor 12 may include a buckle 30 near the distal end 24. The buckle 30 may include a cross-member 32 positioned between side members 34, 36 of the body 20. The buckle 30 may define a first opening 38 and a second opening 40 on opposite sides of the cross-member 32. The second opening 40 may be in fluid communication with the recess 26 such that the channel 28 extends from the buckle 30 to the proximal end 22 of the anchor 12. The buckle 30 may be configured to retain the suture 16. For example, the suture 16 may extend through the body 20 of the anchor 12 into the second opening 40 and may loop over the cross-member 32 and into the first opening 38 to thereby secure the suture 16 to the anchor 12. The suture 16 may extend back through the channel 28 such that a free end of the suture 16 may be tensioned through the body 20 of the anchor 12. Although buckle 30 is exemplified, it will be appreciated that the buckle 30 may include tension lock buckles, ladder lock buckles, ratcheting buckles, cam lock buckles, slide buckles, snap buckles, tie buckles, or any other suitable type of buckle.

The body 20 of the anchor 12 may include a threaded portion with one or more threads 30 along a portion or the entirety of the shaft. For example, the threads 30 may extend along the body 20 from the proximal end 22 to the buckle 30. The distal end 24 around the buckle 30 and the tip may have a smooth and non-threaded outer surface. The thread 30 may have a suitable angle, lead, pitch, etc. to enhance insertion and/or engagement with the bone. Although a threaded portion is exemplified in this embodiment, it will be appreciated that the threads 30 could be substituted with ribs, barbs, teeth, friction surfaces, or other bone fixation mechanisms.

In one embodiment, one anchor 12, 14 is a static anchor and the other anchor 12, 14 is a tension anchor. The anchor 12, 14 is a static anchor if the suture 16 is rigidly attached to the anchor 12, 14, for example, by a knot, glue, crimp, ultrasonic weld, or the like. The static anchor 12, 14 has a cannulated body 20 such that the suture 16 may exit the proximal end 22 without interfering with the anchor threads 30. The buckle 30 may accomodate attachment of the suture 16 for a static anchor 12, 14. The knot, crimp, weld or glue location may be at the buckle 30 and/or within the channel 28 of the anchor body 20. The anchor 12, 14 is a tension anchor if the suture 16 is permitted to move through the buckle 30 to allow for tensioning or loosening of the suture 16. The suture 16 may extend through the cannulated body 20 of the anchor 12, 14, loop around the cross-member 32, and back through the cannulated body 20, such that tension may be applied to the suture 16.

In FIG. 1, the posterior anchor 12 may be a static anchor and the anterior anchor 14 may be a tension anchor. The static anchor 12 may be installed first in the posterior aspect of the tibia 4, and the tension anchor 14 may be subsequently installed and tensioned in the anterior aspect of the tibia 4. The anchors 12, 14 may maximize pullout strength and minimize user steps because the posterior aspect of the tibia 4 may be more difficult to access than the anterior. It will be appreciated that the anchors 12, 14 may have applications throughout the body wherever suture attachment to bone is desired.

Figure 2A:
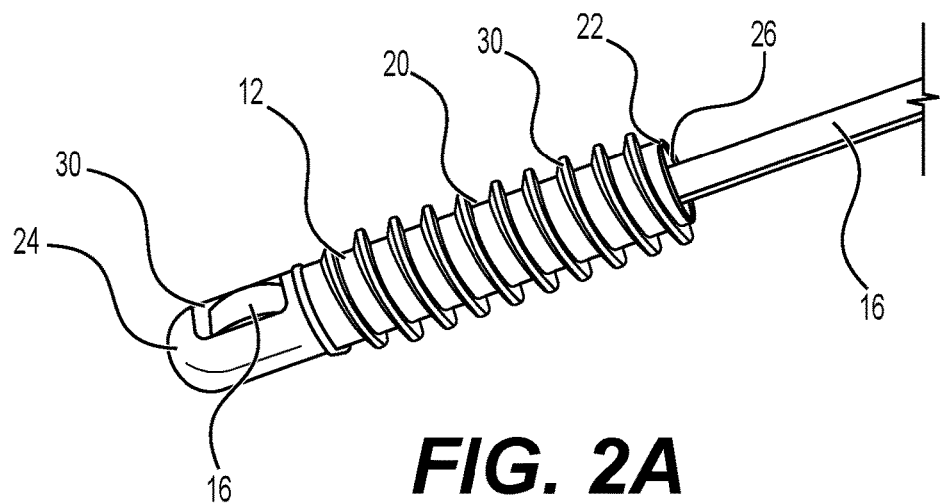
Figure 2D:
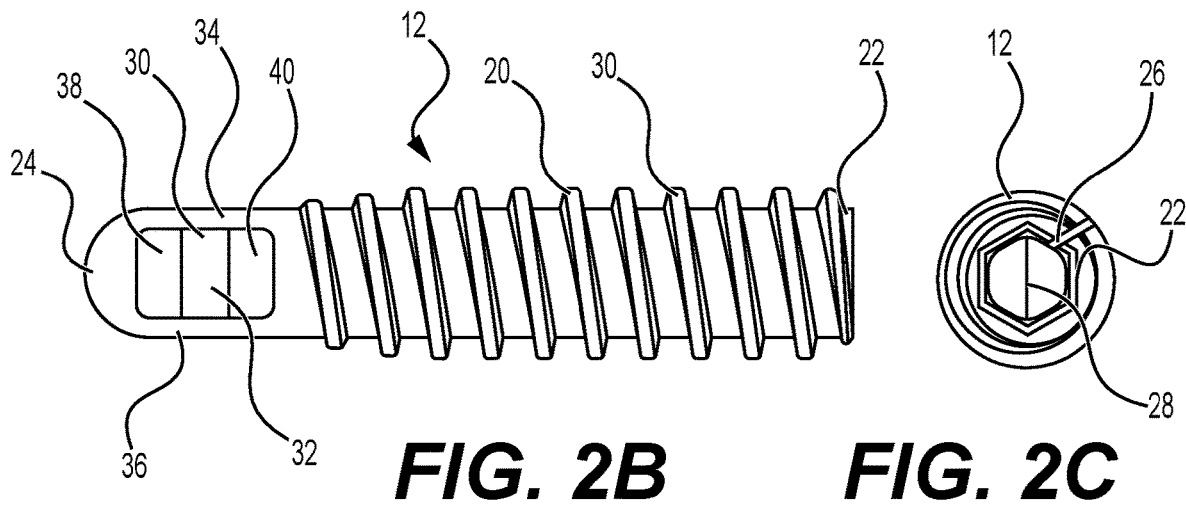
Figure 2D:
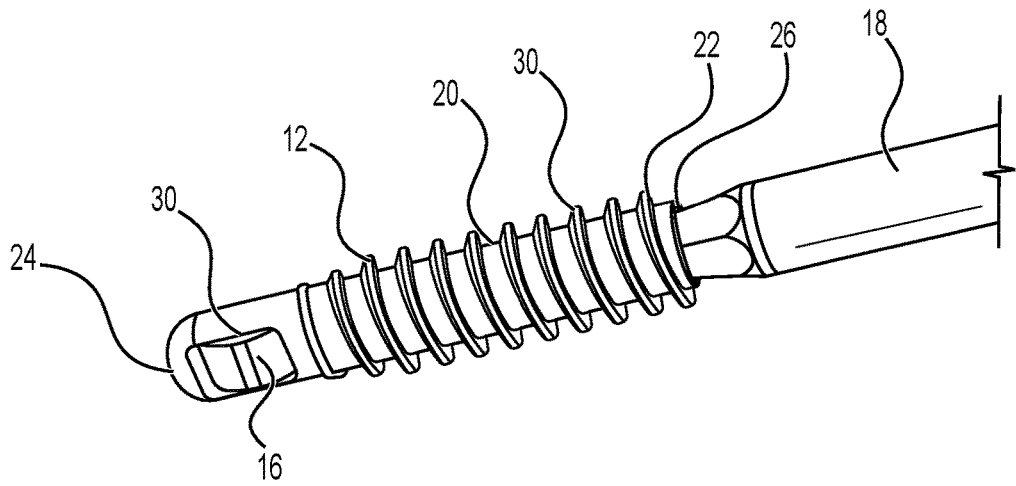
Figure 3A:
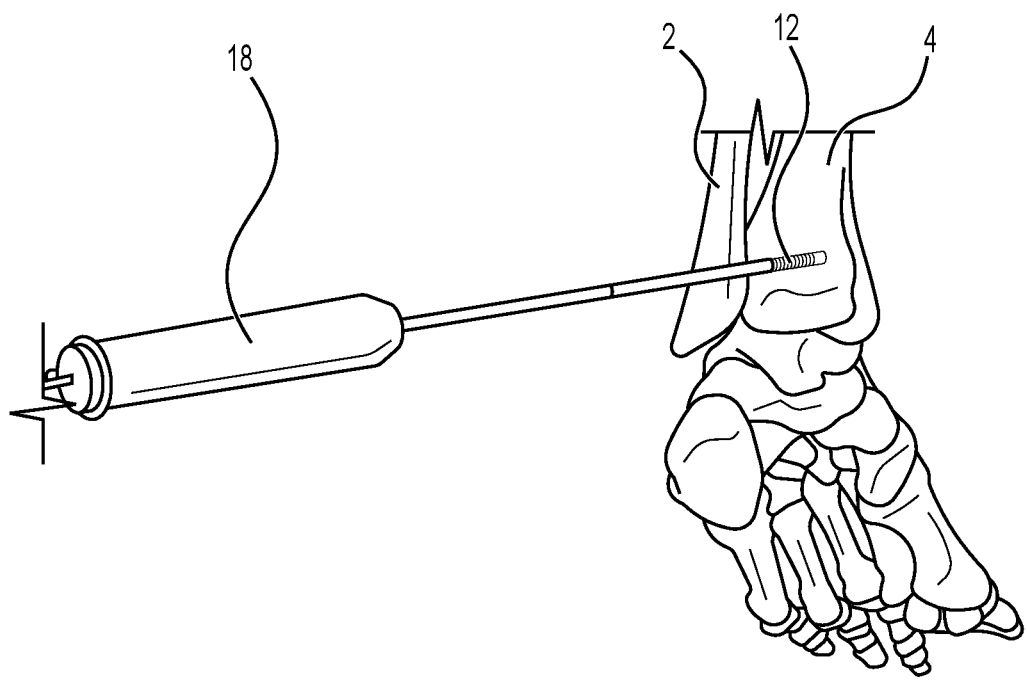
FIGS. 3A-3C depict a method of installing a fibula sling according to one embodiment.
Figure 3B:
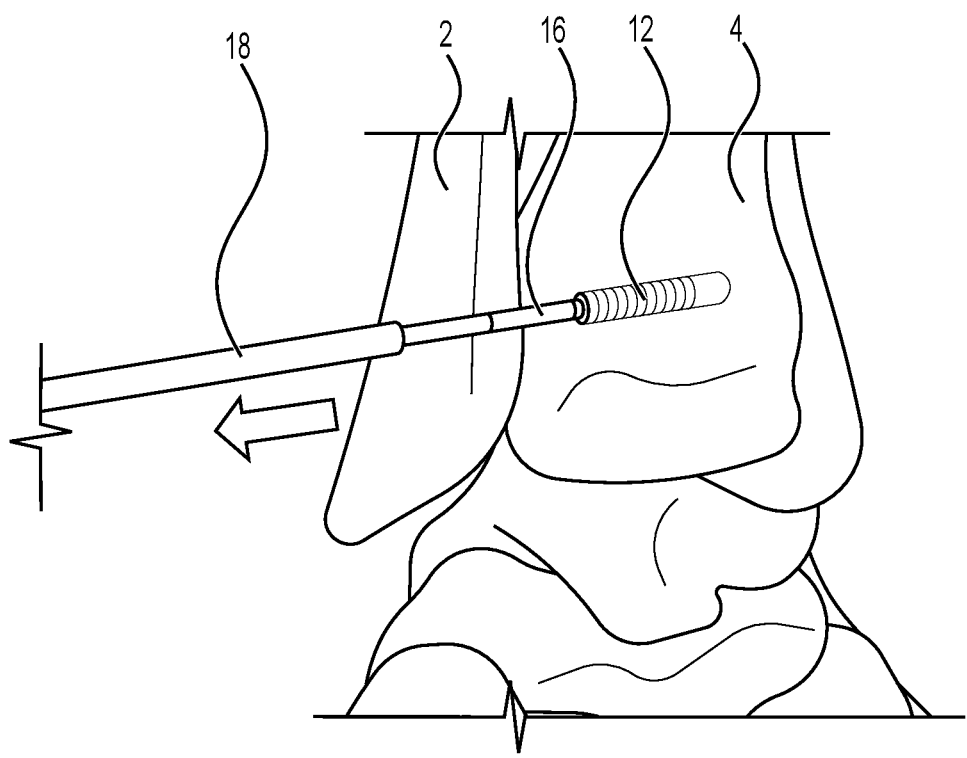
Figure 3C:
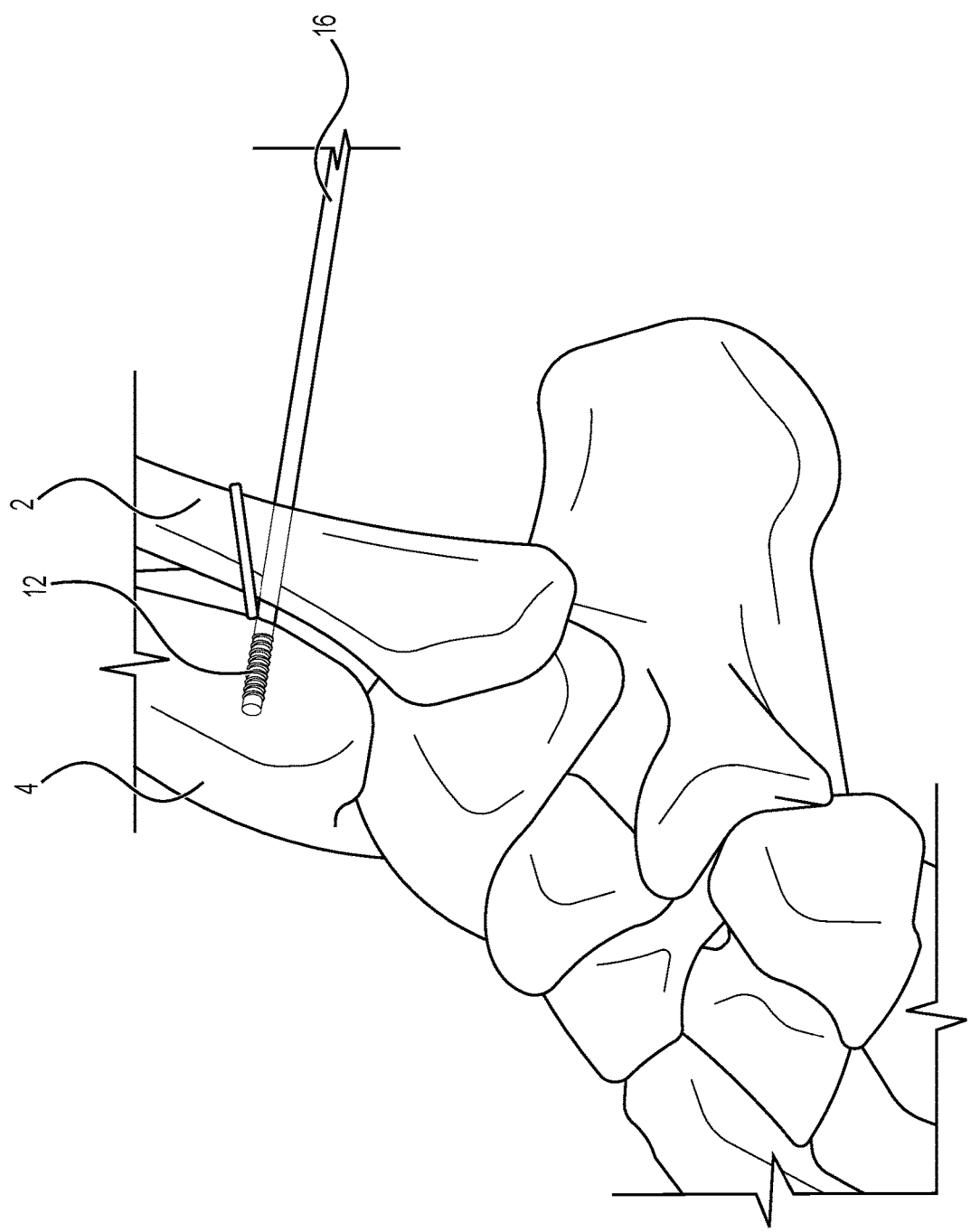

According to one embodiment, a method of installing the fibula sling 10 may including one or more of the following. A posterolateral aspect of the tibia 4 may be accessed and a hole pre-drilled into the tibia 4. As shown in FIG. 2D, the anchor 12, 14 may come pre-attached to the driver 18, with the suture 16 pre-loaded and running through the cannulated driver body 20 for ease of installation. As shown in FIG. 3A, to insert the first static anchor 12, the surgeon simply threads the anchor body 20 into the pre-drilled hole until the anchor 12 is sub-flush (for example, as indicated by a lasermark). As shown in FIG. 3B, the driver shaft 18 is removed. In FIG. 3C, the free-end of the suture 16 is exposed with the anchor 12 buried beneath cortical bone. The free-end of the suture 16 is looped around the fibula 2. The tension anchor 14 is subsequently installed in the anterior aspect of the tibia 4. The suture 16 is tensioned to provide a circumferential force around the fibula 2, thereby stabilizing the fibula 2 and the tibia 4.

Figure 4A:
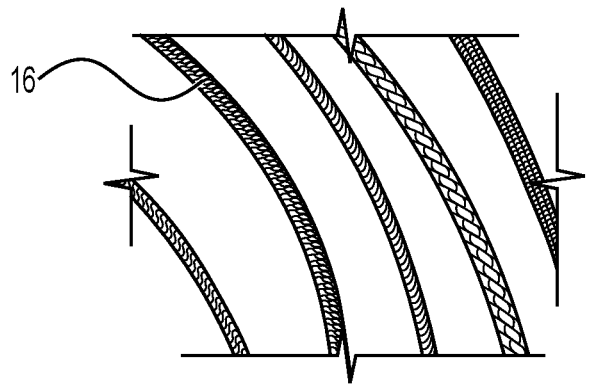
FIGS. 4A-4C show examples of sutures or tethers.
Figure 4B:
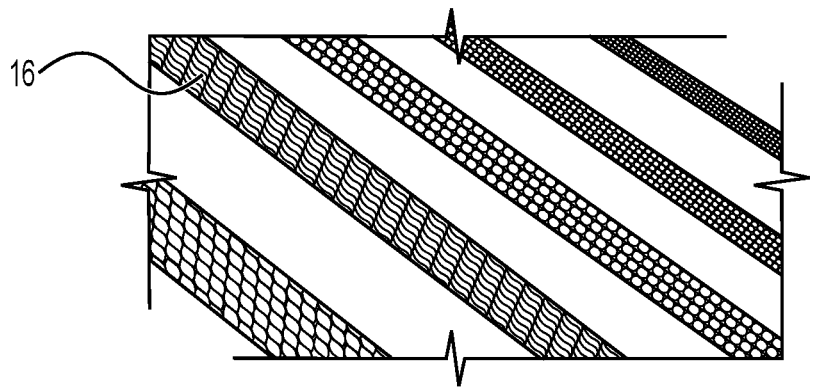
Figure 4C:
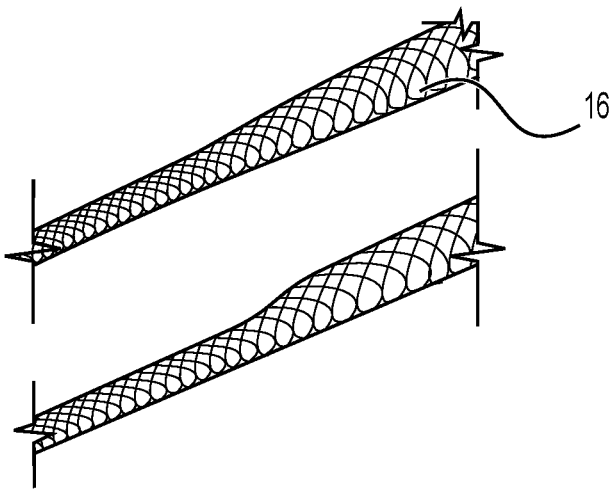

FIGS. 4A-4C depict several different examples of tethers, bands, or sutures 16. The sutures 16 may include polyethylenes (e.g., ultrahigh molecular weight polyethylene or UHMWPE), polypropylenes, silk, polyamides, polyesters, polyethylene terephthalates (PET), polyacrylonitriles, silk cottons, or other suitable biocompatible materials. The sutures 16 may be braided and/or woven using any combination or blend of UHMWPE, polyester, PET polymer fibers, etc. As shown in FIG. 4A, the suture 16 may be round or oval in cross-section. In FIG. 4B, the suture may have a flat or tape geometry. In FIG. 4C, the suture 16 may transition from a round to flat geometry or vice versa. The suture 16 may be fully radiolucent or may have one or more marker strands that are designed to show up on fluoroscopy.

The anchors and other devices described herein may be manufactured from a number of biocompatible materials including, but not limited to, titanium, stainless steel, titanium alloys, non-titanium metallic alloys, polymeric materials, plastics, plastic composites, poly ether ether ketone (PEEK), ceramic, and elastic materials.

Figure 5A:
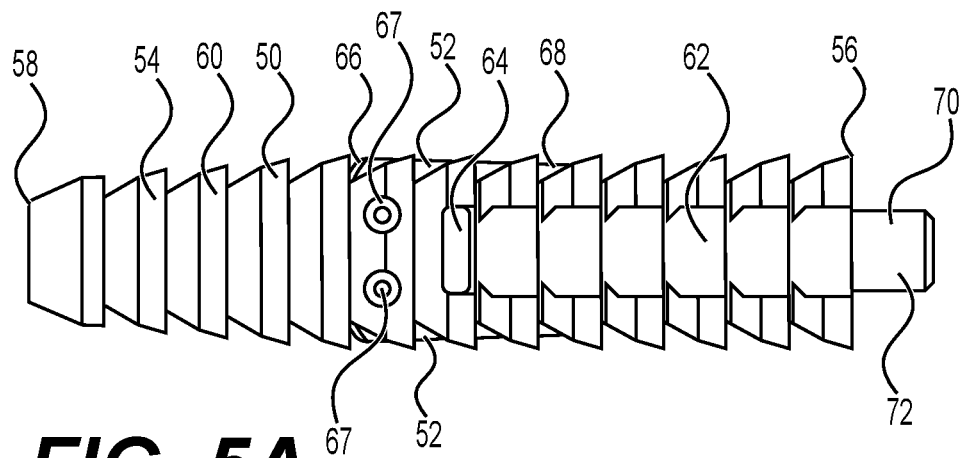
FIGS. 5A-5C show a tensioning anchor including deployable wings according to another embodiment.
Figure 5B:
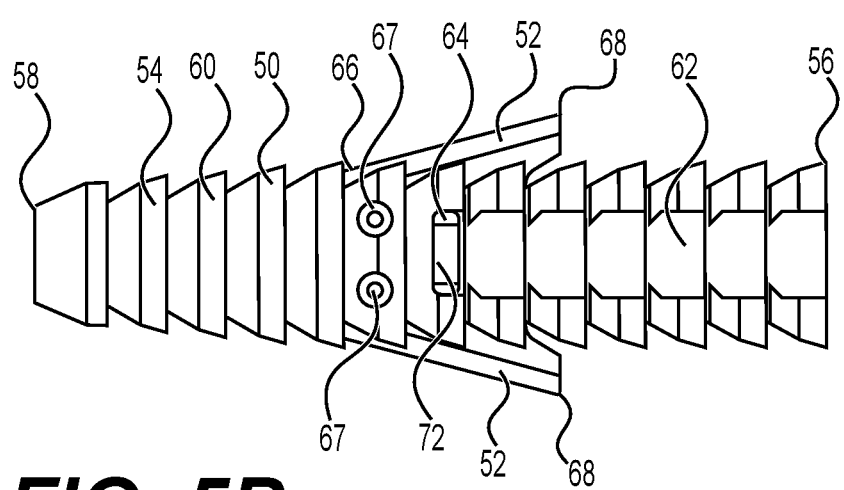
Figure 5C:
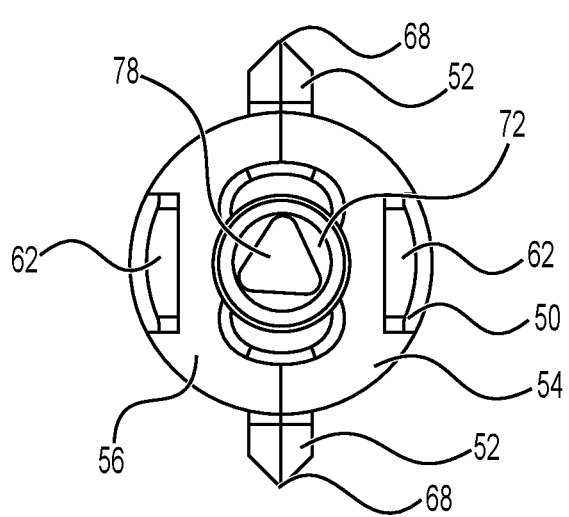

Turning now to FIGS. 5A-5C, another embodiment of an anchor 50 with deployable wings 52 is shown. One or both of the anchors 12, 14 in the stabilization system 10 may be replaced with expandable anchor 50. In one embodiment, the anchor 50 is the anterior (tension) anchor. The anchor 50 is configured to attach the suture 16 to bone and allow tension to be applied and maintained. As best seen in FIG.

5A, the anchor 50 has a collapsed configuration, thereby allowing the anchor 50 to be inserted into the tibia 4, for example, in a minimally invasive manner. As shown in FIG. 5B, once inserted into the tibia 4, the anchor 50 has an expanded or extended configuration where the wings 52 are extended outwardly, thereby securing the anchor 50 in the tibia 4. The wings 52 may be configured to resist anchor pullout. The anchor 50 may have other applications throughout the body wherever suture attachment to bone is desired.

The anchor 50 may have a body 54 extending from a first end or proximal end 56 to a second end or distal end 58. The distal end 58 may be configured to be inserted into the tibia 4. The distal end 58 may have a distal tip that is blunt, but may be configured to be pointed or otherwise configured to engage bone. The body 54 of the anchor 50 may include a ribbed or barbed portion with one or more circumferential ribs or barbs 60 along a portion or the entirety of the shaft. For example, a plurality of ribs or barbs 60 may extend along the body 54 from the proximal end 56 to the distal end 58. Each of the barbs 60 may have a tapered outer surface (e.g., conically tapered). Each barb 60 may have a greater outer diameter toward the proximal end 56 and a smaller outer diameter toward the distal end 58 such that the barbs 60 allow for ease of insertion into the bone but resist pullout of the anchor 50 in the opposite direction. Although a barbed anchor is exemplified in this embodiment, it will be appreciated that the barbs 60 could be substituted with threads, teeth, friction enhancing surfaces, or other bone fixation mechanisms. The tapered and barbed outer geometry of the anchor body 54 is configured for tapping-in to a pre-drilled hole and resisting pullout. In one embodiment, the body 54 is composed of a platic material, such as poly ether ether ketone (PEEK). The plastic composition and geometry of the anchor 50 allows for the barbs 60 to deflect slightly as the barbs 60 are impacted into the hole, and the barb geometry may cause the anchor 50 to resist being pulled backwards.

A suture path 62 along the body 54 may be devoid of ribs 60. For example, the path 62 may include a flattened or concave surface. As best seen in FIG. 5C, the anchor 50 may include two suture paths 62 on opposite sides of the body 54. The path 62 allows for the suture 16 to rest alongside and/or within the body 54 of the anchor 50. The body 54 may define a suture opening 62 extending transversely therethrough. The suture opening 62 may be an elongate opening positioned at a beginning of the suture path 62. The suture opening 62 may be configured to receive the suture 16 therein. The suture opening 64 allows for the suture 16 to be passed through, and the flat suture path 62 on either side of the body 54 makes room for the suture 16 to slide between the anchor body 54 and the bone after being tapped in to the bone.

The anchor 50 includes one or more deployable wings 52, which may provide superior pullout strength. For example, the anchor 50 may include a pair of deployable wings 52 on opposite sides of the body 54. The wing 52 may have a first end 66 pivotably connected to the body 54 of the anchor 50 and a second end 68 expandable into bone. The second end 68 of the wing 52 may be pointed or sharpened. The anchor wings 52 may be tapered and sharp so that the wings 52 can more easily get deployed through bone. The wing geometry may be configured such that the wings 52 resist being expanded past a certain angulation thus also helping resist anchor pullout. Each of the wings 52 may be pivotably connected to the body 54 about a joint, such as a pin joint, for example, via a pivot pin 67. Although pivot pins 67 are exemplified in this embodiment, it will be appreciated that other suitable joints could be selected, such as pivot joints, hinge joints or the like. In this manner, the wing 52 is able to articulate relative to the body 54 of the anchor 50. In a collapsed position, shown in FIG. 5A, the wings 52 are positioned against or nested within the body 54 of the anchor 50, thereby allowing the anchor 50 to be inserted into bone. In an expanded or extended position, shown in FIG. 5B, the wings 52 are extended outwardly and away from the body 54 of the anchor 50, thereby allowing the wings 52 to resist pullout.

Figure 6A:
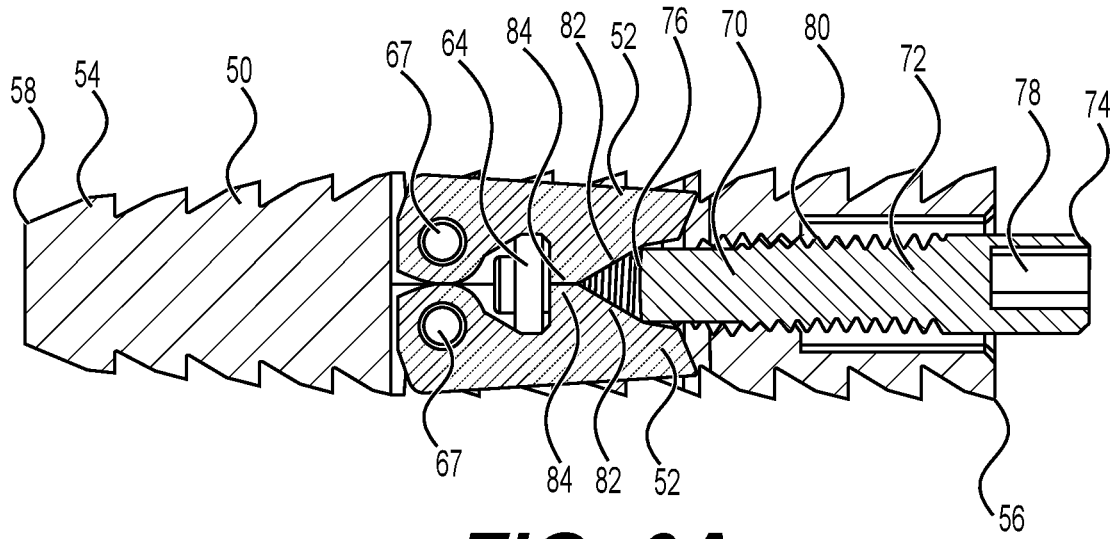
FIGS. 6A-6B show the tensioning anchor of FIGS. 5A-5C with the deployable wings in a retracted position and expanded position, respectively.
Figure 6B:
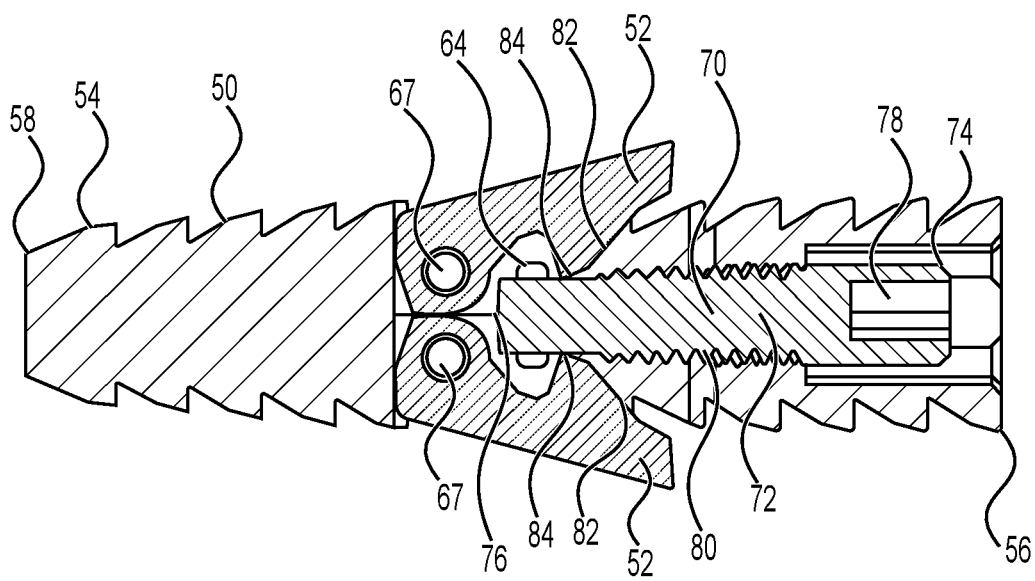

As best seen in the cross-sectional views of FIGS. 6A-6B, the wings 52 are deployable with an articulation assembly 70, which is configured to articulate the wings 52 from the collapsed position to the extended position. In FIG. 6A, the wings 52 are shown in the collapsed position and in FIG. 6B, the wings 52 are shown in the extended position. The articulation assembly 70 may include an actuator 72 extending from a proximal end 74 to a distal end 76. The proximal end 74 may include a recess 78 configured to receive a driving instrument. The actuator 72 may be in the form of a set screw, for example, having an outer threaded portion 80 configured to threadedly interface with a corresponding threaded portion in the body 54 of the anchor 50.

The distal end 76 of the actuator 72 may be configured to engage with a cam surface 82 along an inner portion of each wing 52. As the actuator 72 translates forward, the distal end 76 of the actuator 72 slides against the cam surfaces 82 of the wings 52, thereby pivoting the wings 52 into their extended positions. The cam surface 82 may terminate at a protrusion 84. In the collaposed position, shown in FIG. 6A, the protrusions 84 may contact or be in close proximity to one another. In the extended position, shown in FIG. 6B, the actuator 72 is positioned in a gap between the protrusions 84 of the wings 52, thereby maintaining the maximum extension of the wings 52. The distal end 76 of the actuator 72 is also configured to retain the suture 16 in the suture opening 64. The suture 16 is first passed through the suture opening 64 in the anchor body 54. Next, the anchor 50 is tapped-in beneath the bone surface. Finally, the actuator 72 is advanced, which both crimps down on the suture 16 and deploys the wings 52.

Figure 7A:
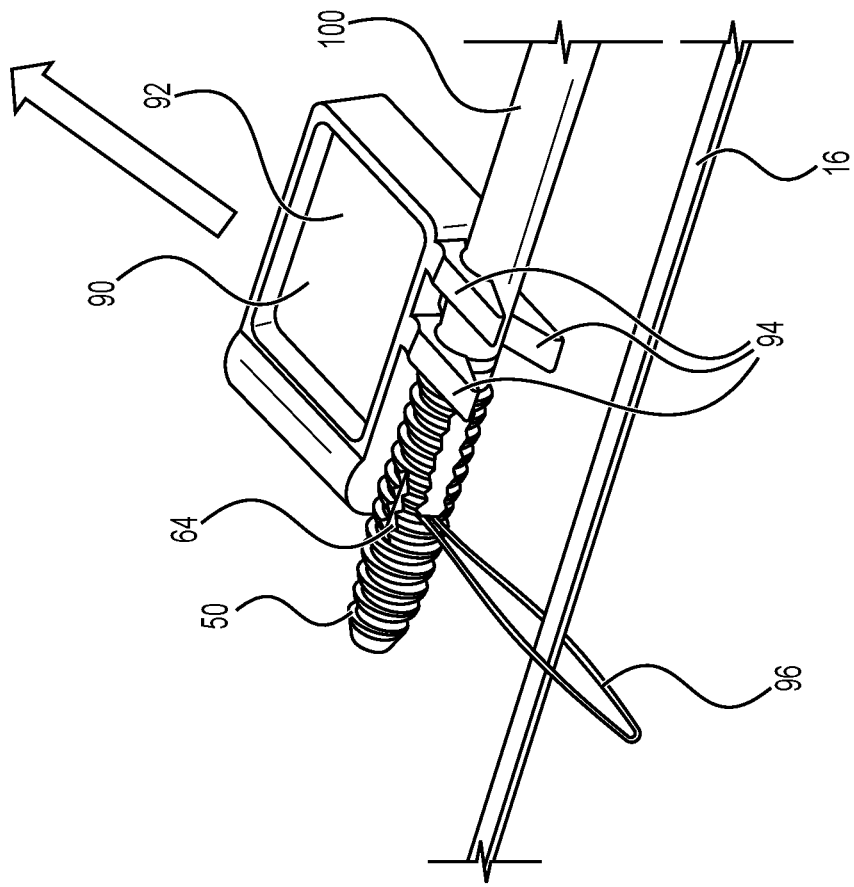
FIGS. 7A-7B show an embodiment of a suture passer instrument.
Figure 7B:
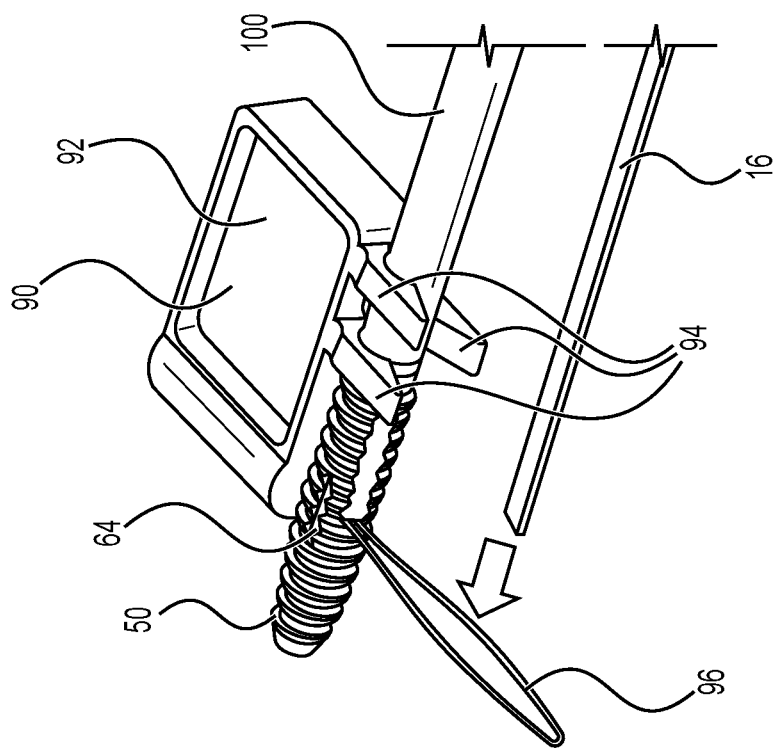

Turning now to FIGS. 7A-7B, a suture passer instrument, threader, or passer 90 may be used to thread the suture 16 through the opening 64 in the body 54 of the anchor 50. The suture passer 90 may include a body 92 with a plurality of prongs 94 configured to hold the inserter/tensioner instrument 100 and a loop of wire 96 extending from the body 92 of the passer 90. The loop of wire 96 is positionable through the opening 64 in the anchor 50 such than an edge of the passer 90 abuts the anchor 50 and the inserter 100 and the prongs 94 retain the inserter 100. As shown in FIG. 7A, a free end of the suture 16 is passed through the loop of wire 96. As the passer 90 is removed from the anchor 50 and inserter 100, the loop of wire 96 pulls the suture 16 through the anchor suture opening 64, thereby threading the suture 16 through the anchor 50.

Figure 8A:
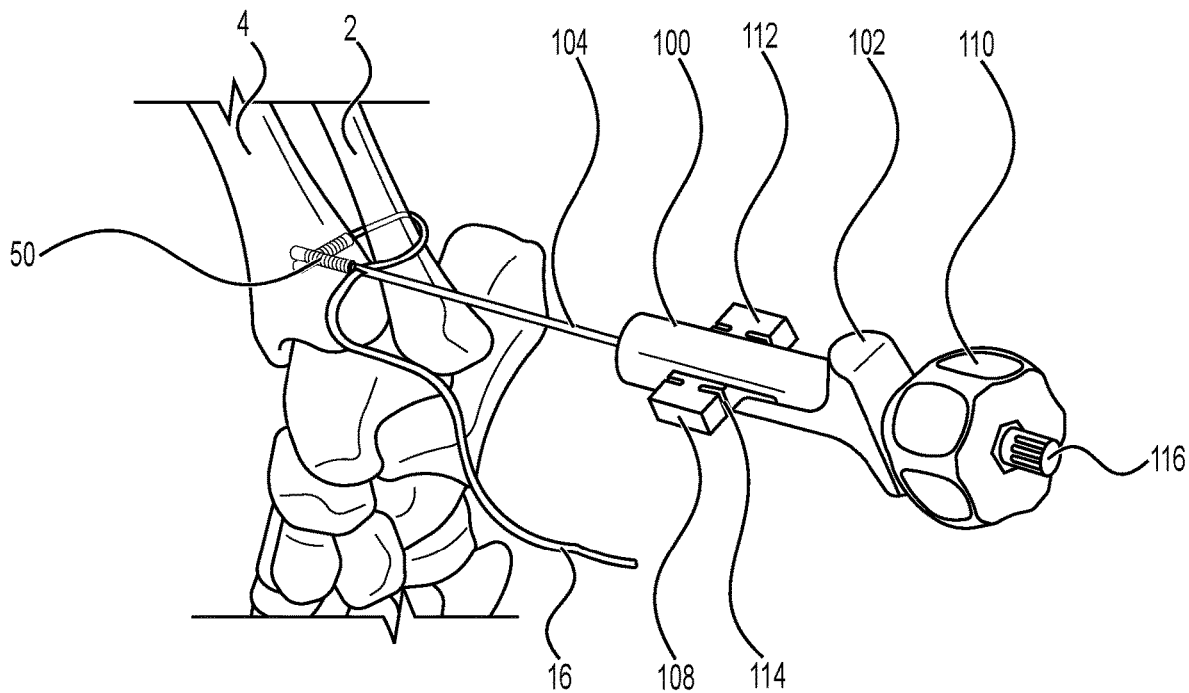
FIGS. 8A-8D show an inserter tensioning instrument and tensioning the suture around the fibula according to one embodiment.

Turning now to FIGS. 8A-8D, an inserter and/or tensioning instrument 100 may be used to insert the anchor 50 and/or tension the suture 16. The inserter/tensioner 100 includes a body 102 with an outer shaft 104 configured to connect to the proximal end 56 of the anchor 50 and an inner shaft 106 positionable through the outer shaft 104 and configured to rotate the actuator 72 of the anchor 50. The inner shaft 106 may be rotatable via a knob 116. As shown in FIG. 8A, after the suture 16 has been passed through the anchor 50, the tensioning anchor 50 is tapped into the anterolateral tibia 4, for example, to a lasermarked line on the inserter 100.

Figure 8B:
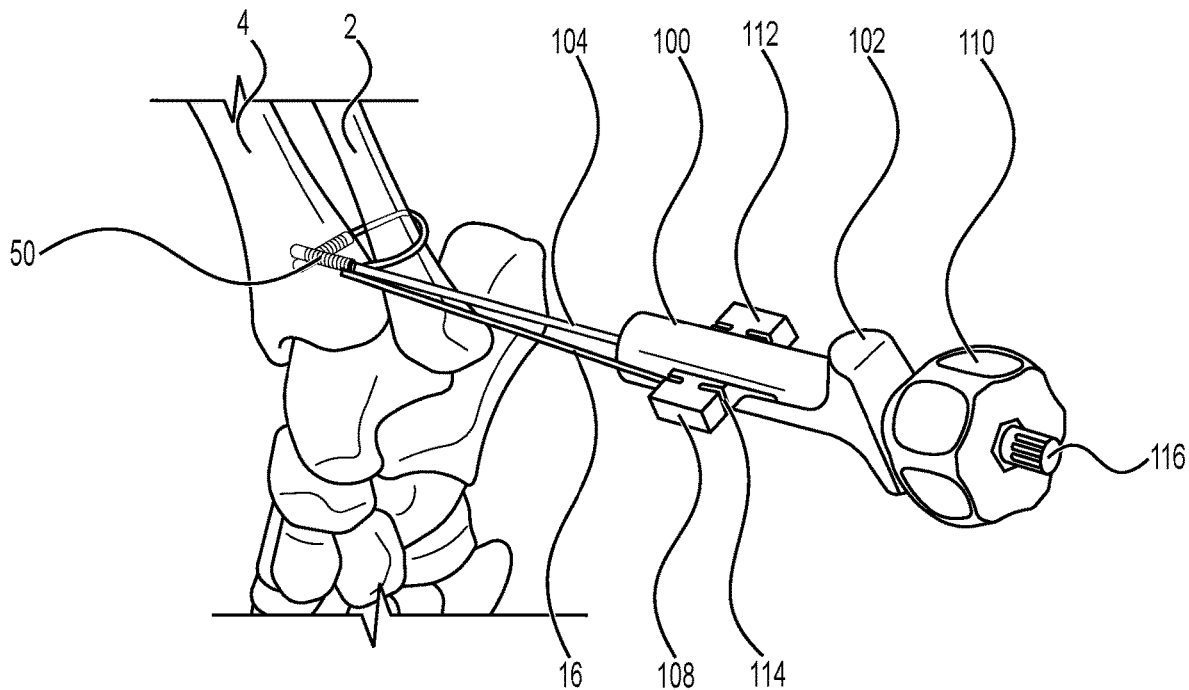
Figure 8C:
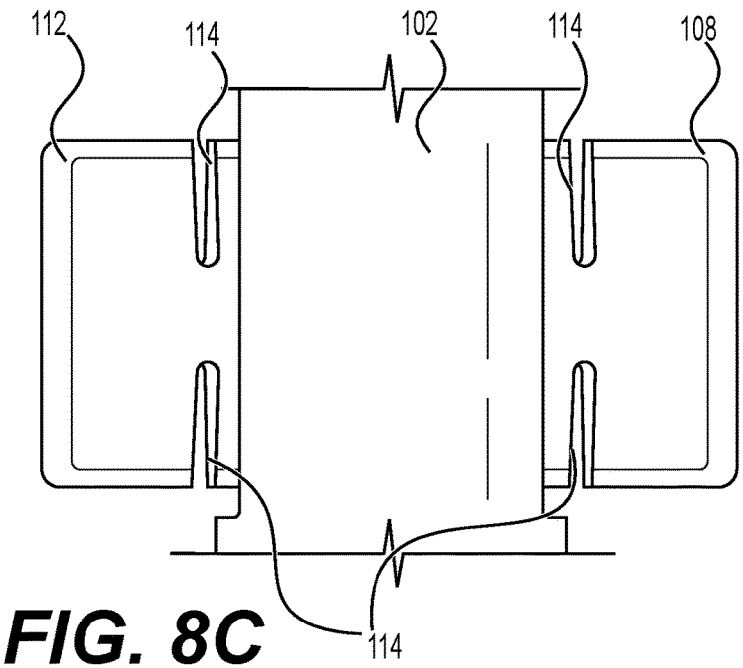
Figure 8D:
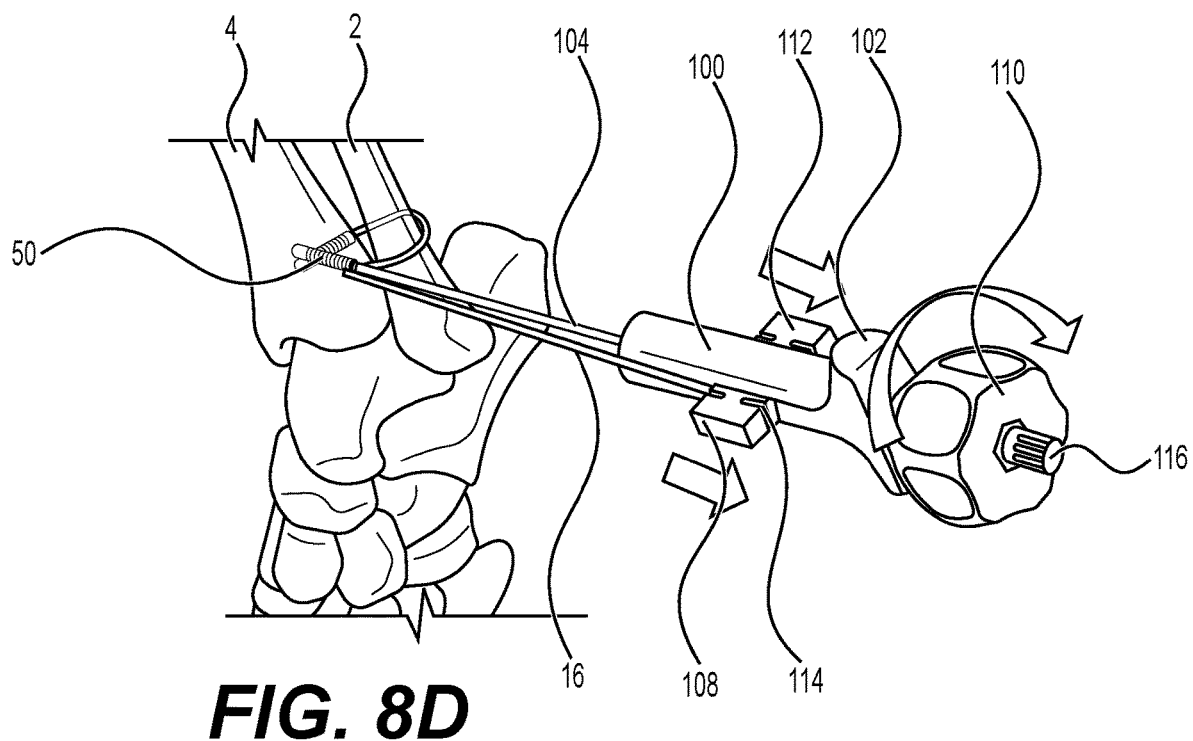

The instrument 100 includes a tensioner assembly 108 including a rotatable handle 110 and a tensioner plate 112. As shown in FIG. 8B, the suture 16 is attached to the tensioner assembly 108. As best seen in FIG. 8C, the plate 112 includes a plurality of slits 114, which retain the suture 16, for example, when wound or wrapped around the plate 112 and between the slits 114. The plate 112 may include a first pair of aligned slits 114 on one side of the body 102 and a second pair of aligned slits 114 on the opposite side of the body 102. The suture 16 may be wrapped between one pair of slits 114, for example. As shown in FIG. 8D, when the handle 110 is rotated, the tensioner plate 112 is translated proximally and away from the anchor 50. By rotating the handle 100, the suture 16 is pulled, thereby applying tension to the construct.

Figure 9A:
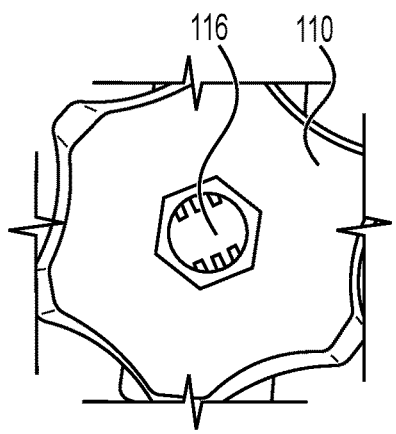
FIGS. 9A-9D show the handle and knob of the inserter tensioning instrument of FIGS. 8A-8D for applying tension and crimping the suture.
Figure 9B:
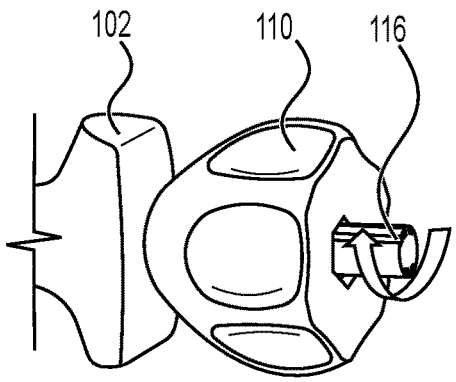
Figure 9C:
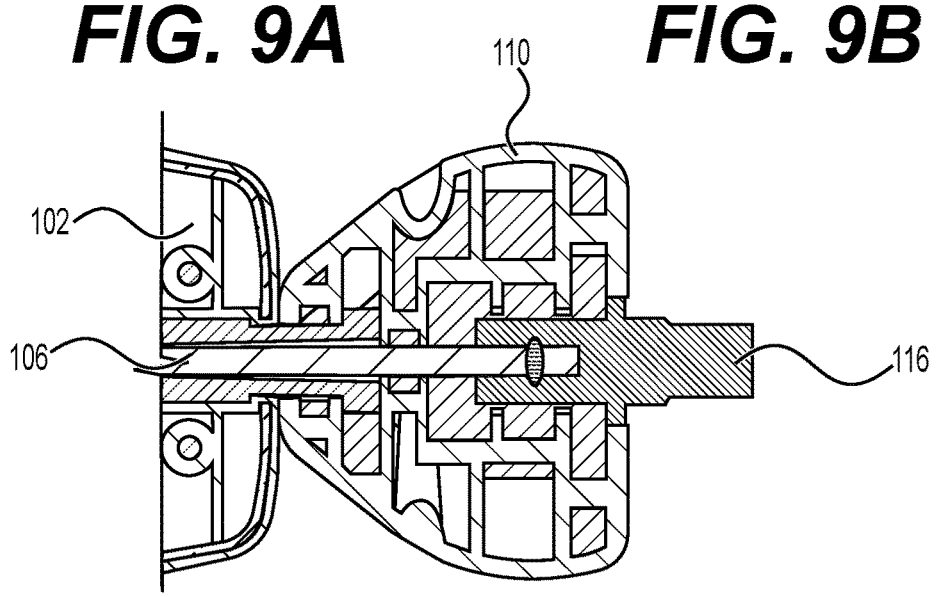
Figure 9D:
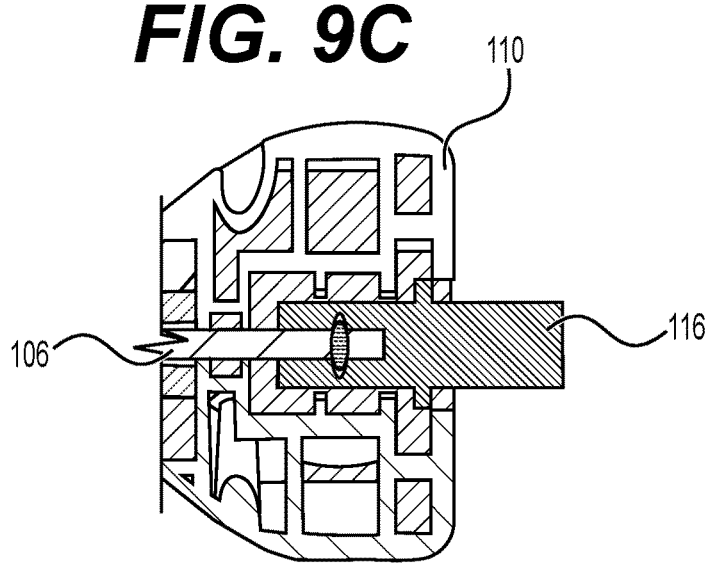
Figure 10A:
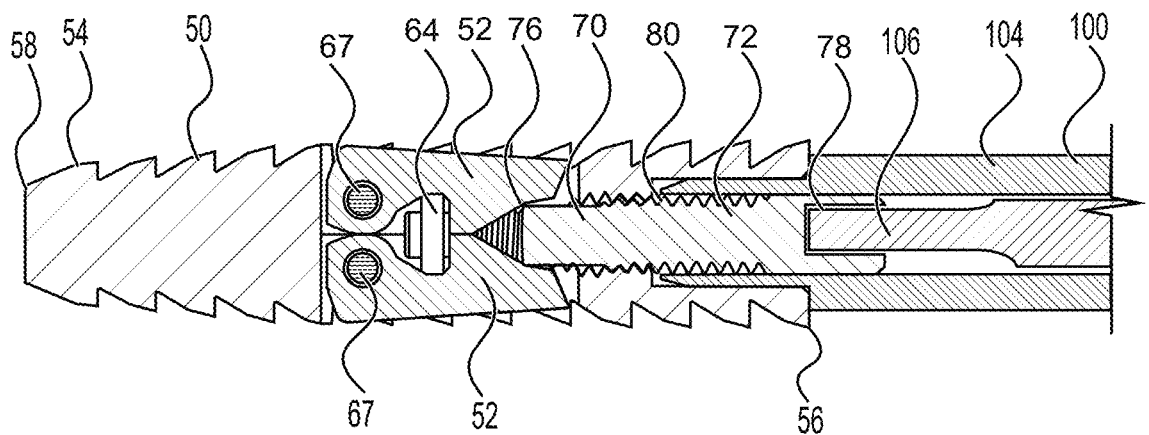
FIGS. 10A-10C show the tensioning anchor with deployable wings connected to the inserter tensioning instrument in a retracted position, expanded position, and crimped position, respectively.
Figure 10B:
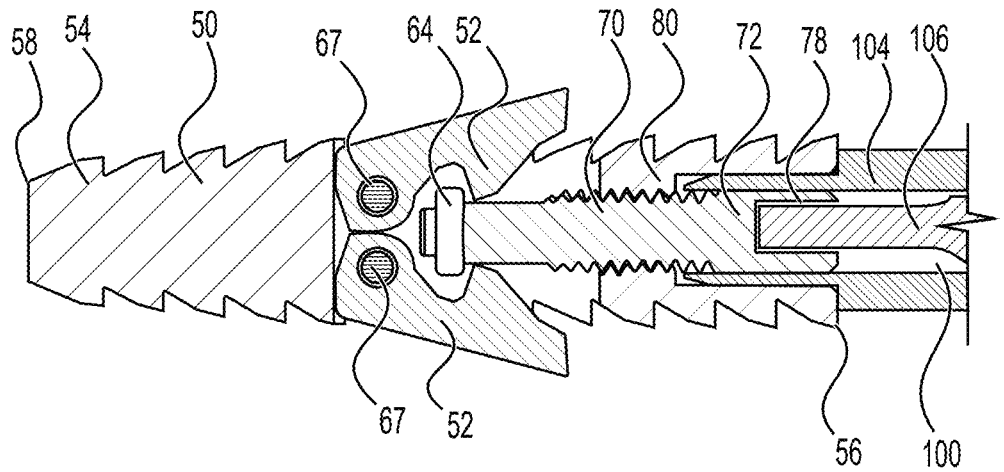
Figure 10C:
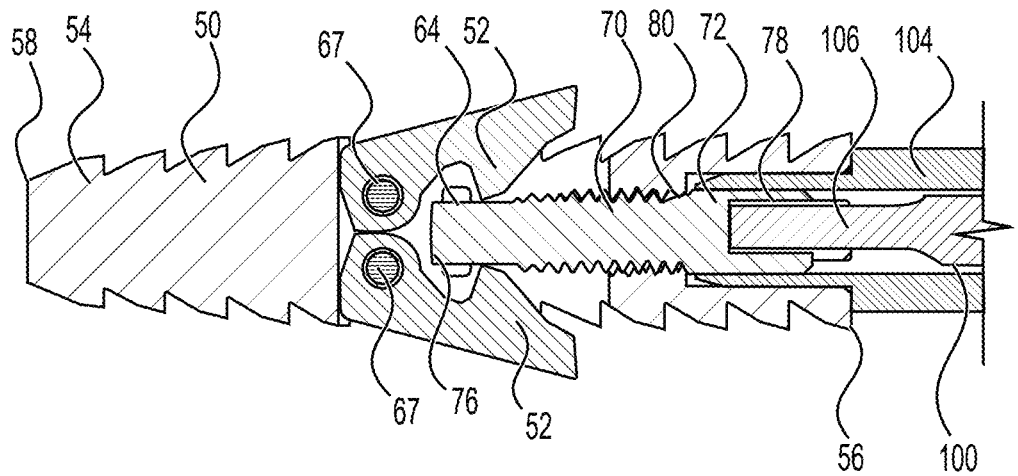

As best seen in FIGS. 9A-9D, the handle 110 and knob 116 may be integrated such that rotaton of the handle 110 also rotates the knob 116. In FIG. 9C, the knob 116 is mated to the handle 110. By rotating the handle 110, simultaneously the knob 116 is also being turned, which deploys the anchor wings 52. The handle 110 may continue to be turned to increase the tension in the construct until the desired reduction is achieved. Once final tensioning has been reached, the knob 116 may be finger turned to crimp down the actuator 72 onto the suture 16 to lock the suture 16 in place. In FIG. 9D, the knob 116 is pressed into and disengaged from the handle 100 such that the knob 116 is able to be fine tuned. After tensioning the suture 16 and deploying the wings 52, the inserter 100 may be removed from the anchor 50. FIGS. 10A-10C show the inserter 100 attached to the anchor 50 with the wings 52 contracted (FIG. 10A), the wings 52 expanded (FIG. 10B), and the wings 52 are expanded with the actuator 72 in the final position that crimps down the suture 16, when present (FIG. 10C).

Figure 11:
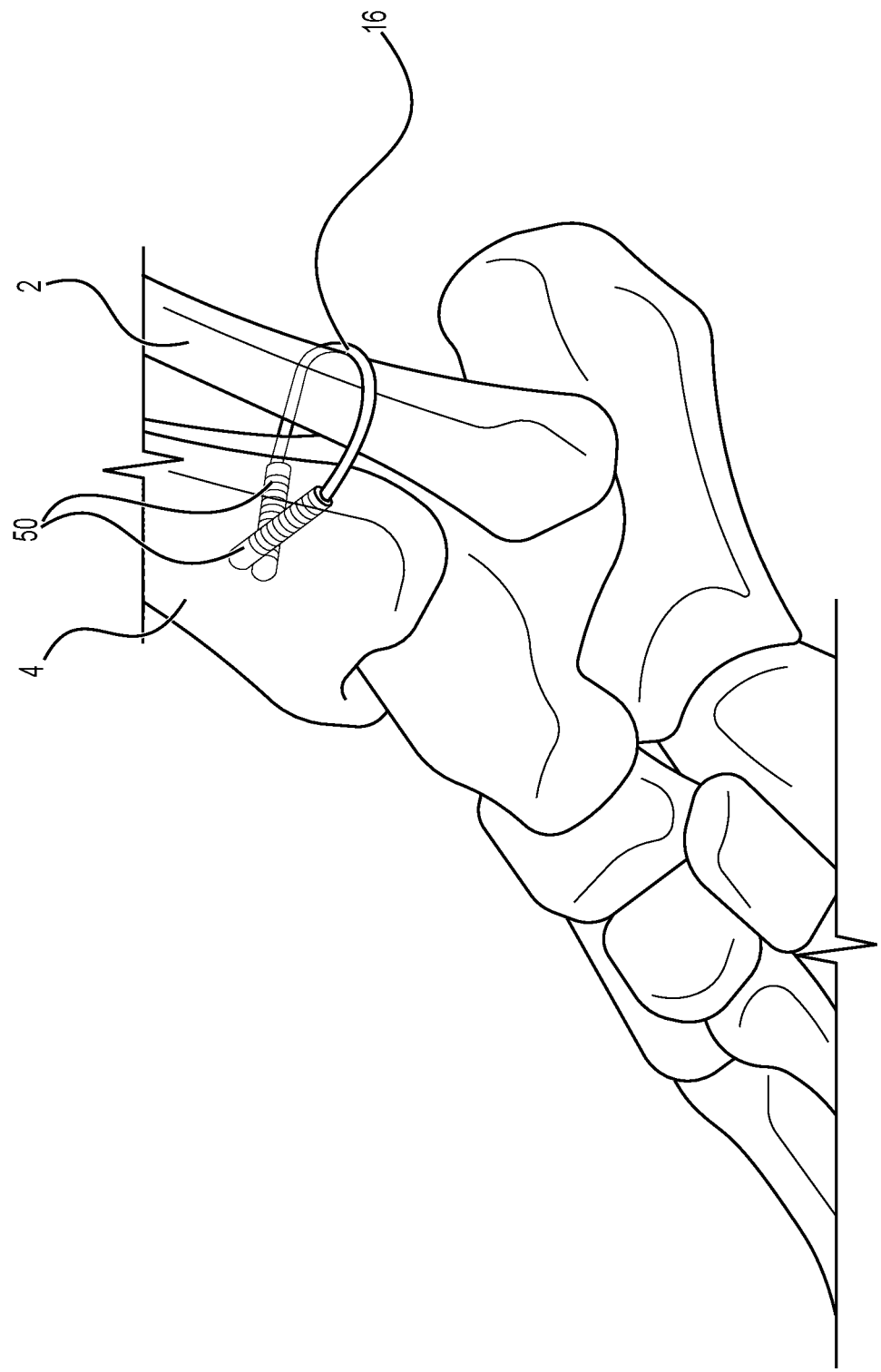
FIG. 11 depicts the fibula sling stabilization system implanted into the tibia and supporting the fibula.
Figure 12:
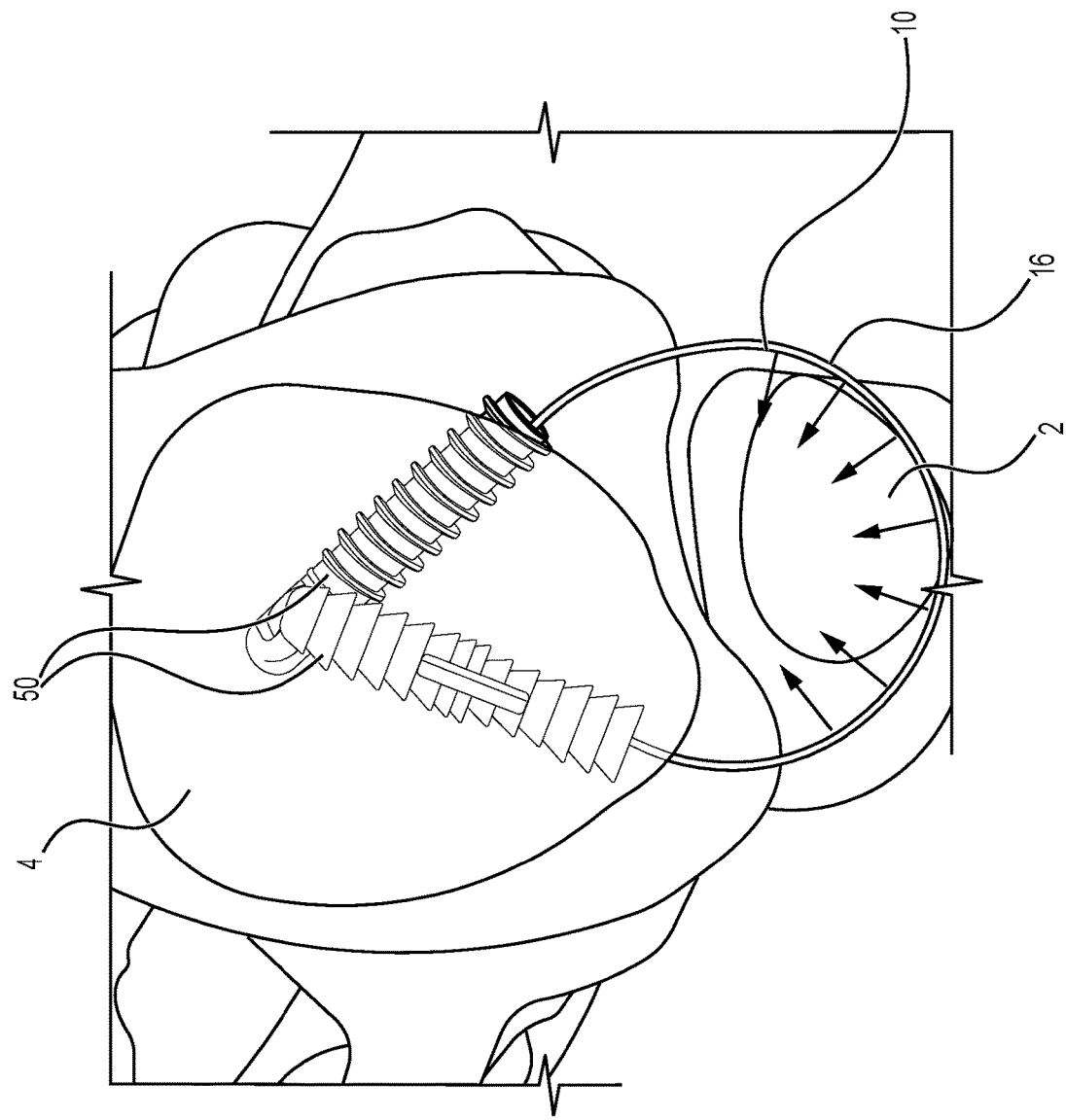
FIG. 12 depicts the circumferential force applied to the fibula by the suture.

FIG. 11 depicts an example of an ankle joint stabilized with the stabilization system 10. Two anchors 12, 14, 50 are positioned into the tibia 4 on posterior and anterior sides of the tibia 4. The tensioned suture 16, secured by the pair of anchors 12, 14, 50, wraps around the fibula 2 to stabilize the joint. FIG. 12 shows the circumferential force that the suture 16 may apply to the fibula 2. Although the suture 16 is shown wrapped around the bare fibula 2, the suture 16 may also go above or below a fibula plate as well. The fibula sling system 10 may work over a pre-existing fibula plate. The fibula sling system 10 may act to restore the fibula 2 to its normal anatomical position. The internal sling provides less risk of mal-reduction due to poor implantation (e.g., screw or suture button trajectory). Without screws or buttons, there is no implant prominence on the lateral or medial aspects of the tibia 4 or fibula 2, which provides less tissue irritation and pain for the patient. There is no loss of fixation due to implant subsidence in poor bone. Without the need to drill holes into the fibula 2, the risk of inducing stress fractures may be minimized.

Turning now to FIGS. 13A-13D, a targeting guide 120 for positioning and installing an anchor, such as anchor 12, 14, 50, is shown. In particular, accessing the posterior anchor site in the ideal trajectory and position may be challenging without the aid of targeting instrumentation. The targeting guide 120 may be used during the bone preperation steps to provide the surgeon with optimal drill trajectories based on location relative to the most distal aspect of the fibula 2. The targeting guide 120 hooks onto the distal fibula 2, and may be placed over the fibula 2 with or without a fibula plate 122.

Figure 13A:
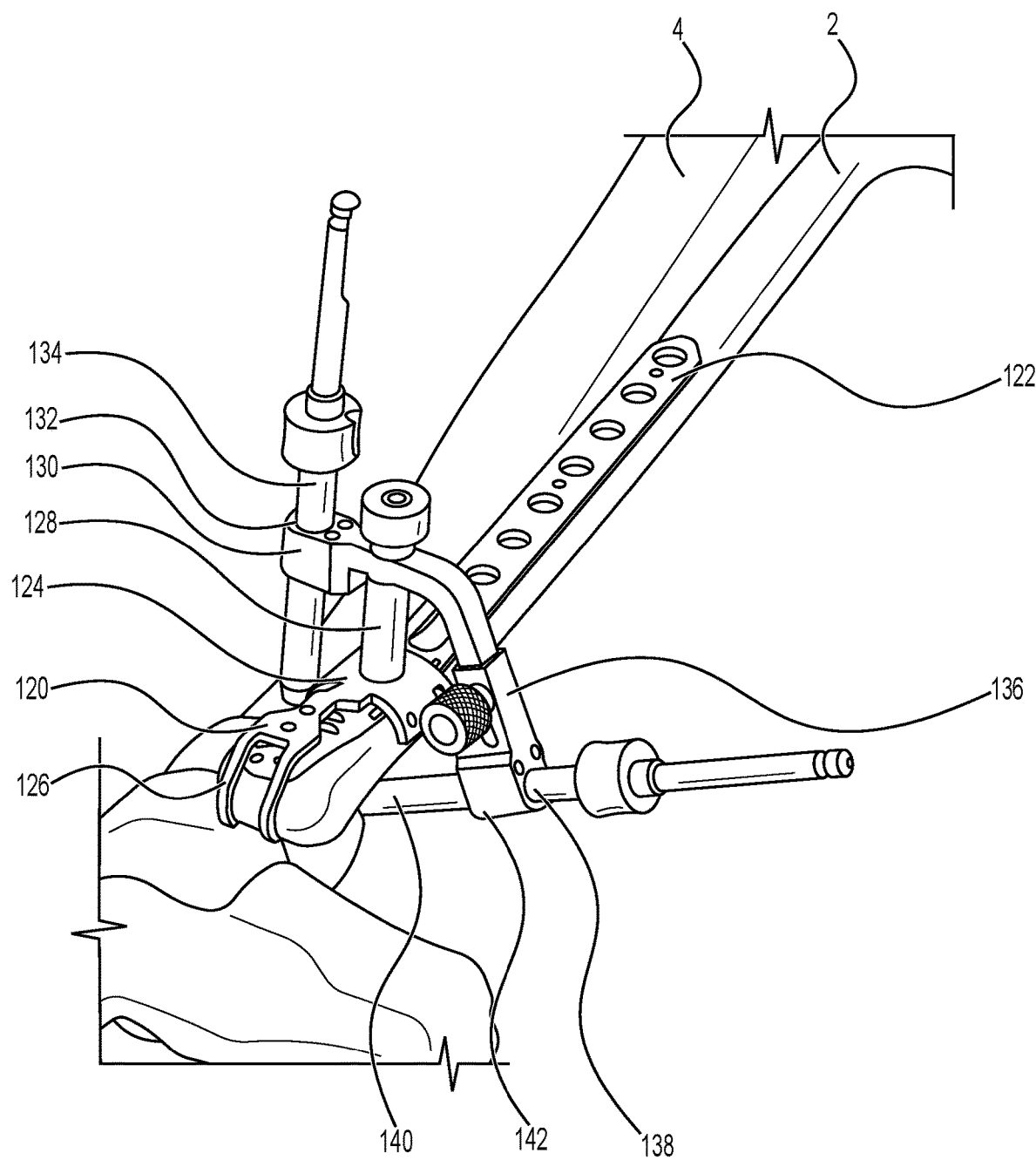
FIGS. 13A-13D show an embodiment of a targeting guide for installing anchors into the tibia.
Figure 13B:
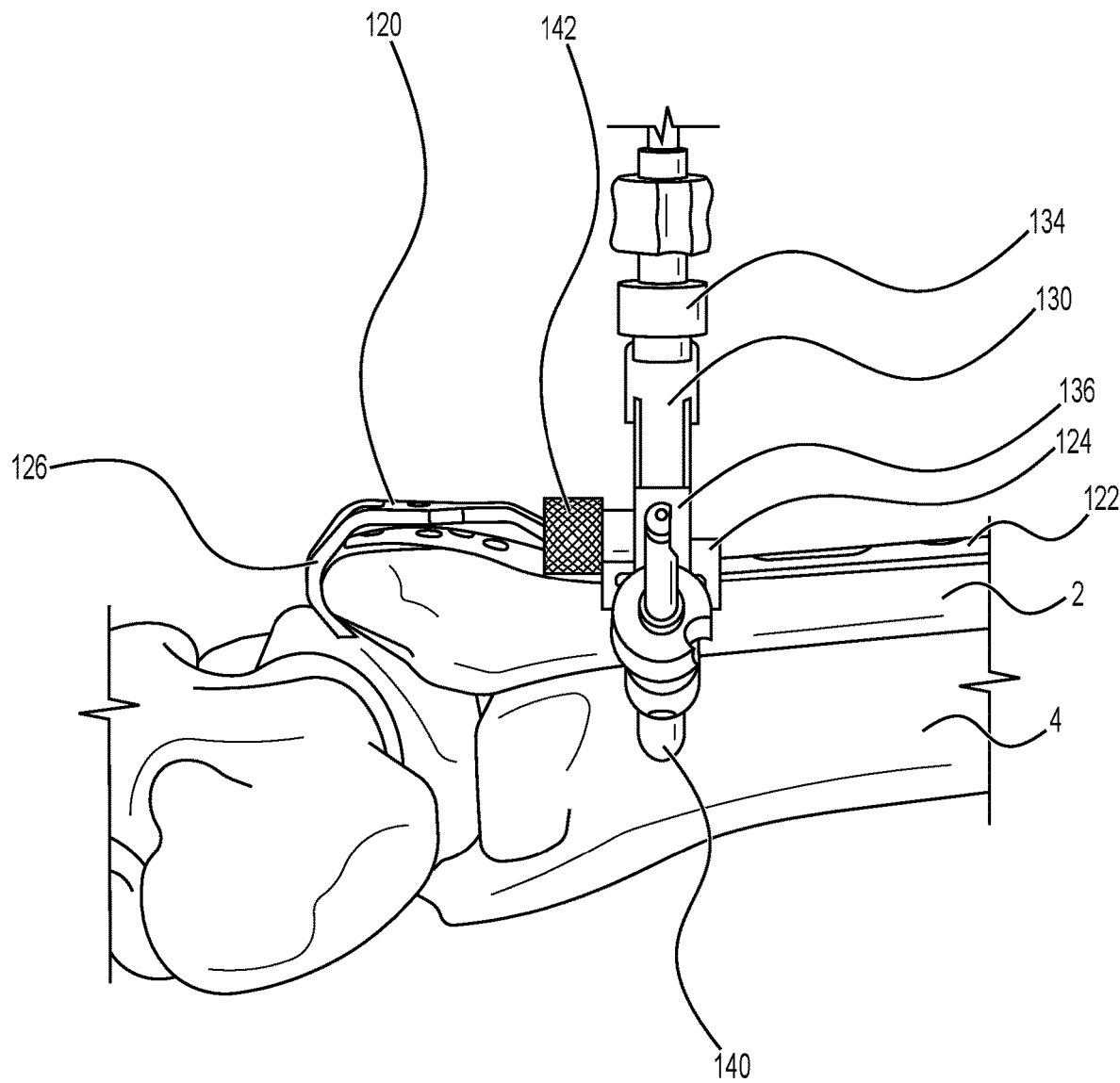

In FIG. 13A, an example of a fibula plate 122 is shown on the fibula 2. Examples of fibula plates can be found, for example, in U.S. Patent Publication No. 2018/0049784 and U.S. Patent Publication No. 2018/0049783, which are incorporated herein by reference in their entireties for all purposes.

The targeting guide 120 may include a base 124 configured to engage with the fibula 2 or the face of a plate, if present (e.g., fibula plate 122). The base 124 may be curved or contoured to mimic the shape of the bone or plate. A hook 126 extends from the base 124 and is configured to hook onto the distal end of the fibula 2. The hook 126 may include a pair of curved hook members sized and dimensioned to engage the anatomy of the distal fibula 2. A post 128 connects the base 124 to a first arm 130. The first arm 130 includes a first guide opening 132 configured to receive a first aiming sleeve 134. The guide opening 132 and first aiming sleeve 134 may be configured to target the anterior drill location on the tibia 4. The first arm 130 slidably engages with a second arm 136. The first arm 130 may be bent to ensure the optimal trajectories. The second arm 136 includes a second guide opening 138 configured to receive a second aiming sleeve 140. The guide holes 132, 138 accept aiming sleeves 134, 140 that interface with drill guides, drills, trocars, k-wires, etc. The second arm 136 is slidable relative to the first arm 130 in order to target the posterior drill location on the tibia 4. When the desired position is located, the second arm 136 may be locked in postion via attachment nut 142. By adjusting the second arm 136 relative to the first arm 130, the insertion guide 120 facilitates adjustment in the transverse plane.

Figure 13C:
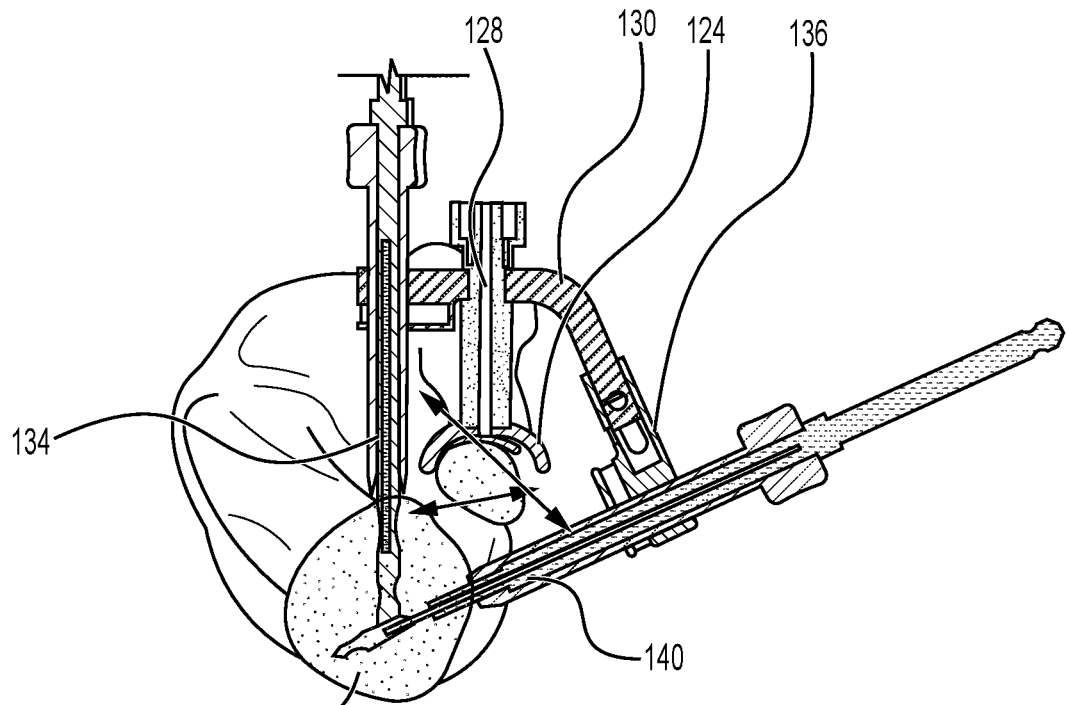
Figure 13D:
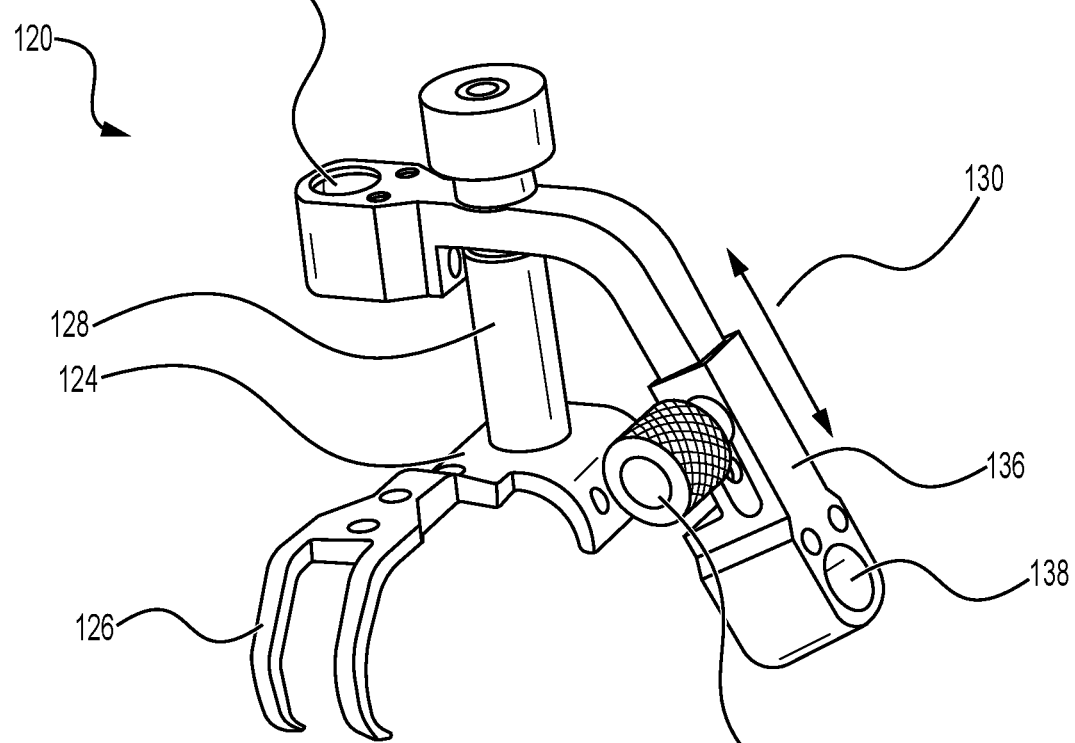

As best seen in FIG. 13C, the first aiming sleeve 134 targets the anterior drill location and the second aiming sleeve 140 targets the posterior drill location. An angle between the first aiming sleeve 134 and the second aiming sleeve 140 may be optimized for anchor locations. For, example, the angle between the first aiming sleeve 134 and the second aiming sleeve 140 may be about 50°-70°, about 55°-65°, or about 60°. The targeting guide 120 provides correct distance proximally from the distal aspect of the fibula 2 to ensure the anchors 12, 14, 50 do not violate the talo-tibial joint line. The insertion guide 120 may maintain optimal drill trajectories and angles to facilitate perpendicular insertion to the tibia 4.

Figure 14D:
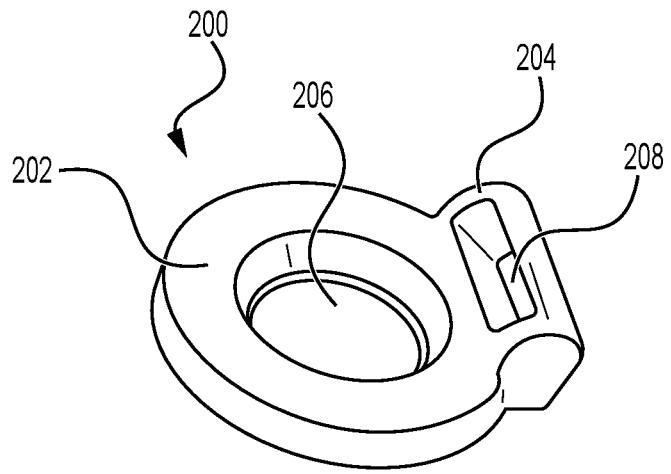

Turning now to FIGS. 14A-14E, another embodiment of a stabilization system 160 is shown for the fixation of syndesmosis disruptions. The stabilization system 160 may include a posterior anchor assembly 162, an anterior anchor assembly 164, and a tether or suture 166 linking the posterior and anterior anchor assemblies 162, 164. The suture 166 is configured to cradle the fibula 2 to stabilize the fibula 2 and tibia 4. The posterior and anterior anchor assemblies 162, 164 may be positioned into cortical bone of the tibia 4. The suture 166 connecting the two anchor assemblies 162, 164 may be wrapped around the bare fibula 2 (as shown in FIGS. 14A), positioned above a fibula plate 122 (as shown in FIG. 15A), or positioned below a fibula plate 122. The stabilization system 160 may be configured to aid in anatomic reduction.

The posterior and anterior anchor assemblies 162, 164 anchor into the posterior tibia 4 and the anterior tibia 4, respectively. The posterior and anterior anchor assemblies 162, 164 may be the same or different. In this embodiment, one of the anchor assemblies 162, 164 is a static anchor and the other anchor assembly 162, 164 is a tensioning anchor. For example, the anterior anchor assembly 164 may be used as a tensioning side on the anterior portion of the tibia 4, the posterior anchor assembly 162 may be used as a static side on the posterior portion of the tibia 4, or vice versa. The anchor assemblies 162, 164 are connected by the suture 166 that is tensioned to stabilize the fibula 2 relative to the tibia 4.

According to one embodiment, the tensioning anchor assembly 164 includes a buckle washer 170 and an anchor 172. The anchor 172 may be a separate component from the buckle washer 170 or integrated therewith. The buckle washer 170 may include a washer or ring 174 and a buckle 176. The washer or ring 174 may include a disk-shaped plate with a central hole 178 extending therethrough. The buckle 176 may protrude from one side of the ring 174. The buckle 176 may be a slide buckle or tri-glide adjuster, for example. The buckle 176 may include a cross-member 180 positioned between side members 182, 184. The buckle 176 may define a first opening 186 and a second opening 188 on opposite sides of the cross-member 180. The buckle 176 includes an upper member 190 above the cross member 180 and between the side members 182, 184. The openings 186, 188 may include teeth or other friction enhancing surfaces.

The buckle 176 may be configured to retain the suture 166. For example, as shown in FIG. 14C, the cross-section of the tensioning assembly 164 is shown with the suture 166 wrapped around the buckle 176. The free end or tail end 168 of the suture 166 may be threaded through the second opening 188, up and over the upper member 190, down and through the first opening 186, around the cross member 180, and back through the second opening 188. This wrapping pattern allows the tail end 168 to be pulled to tighten the tension in the suture 166, thus bringing the fibula 2 closer to the tibia 4. By wrapping the suture 166 through the buckle 176, the buckle 176 prevents the suture 166 from loosening due to the friction created. Although buckle 176 and the wrapping pattern is shown, it will be appreciated that other buckles or interlacing of the suture 166 may be used to provide tensioning to the suture 166.

The buckle washer 170 may be secured to bone with anchor 172. The anchor 172 may include a bone screw, nail, or other type of anchor. In particular, anchor 172 may extend through opening 178 in buckle washer 170. The anchor 172 may include a head 192 with a recess configured to receive an instrument for inserting the anchor 172 and a threaded shaft 194 configured to be inserted into bone. The shaft 194 may have a distal tip that is pointed, blunt, or otherwise configured to engage bone.

According to one embodiment, the static anchor assembly 162 includes a static washer 200 and anchor 172. The anchor 172 may be a separate component from the static washer 200 or integrated therewith. As shown in FIG. 14D, the static washer 200 may include a washer or ring 202 and a loop 204. The washer or ring 202 may include a disk-shaped plate with a central hole 206 extending therethrough. The loop 204 may protrude from one side of the ring 202. The loop 204 may include a single elongate opening 208 for retaining and securing the suture 166. For example, the suture 166 may be looped through the opening 208. The suture 166 may be rigidly attached to the loop 204, for example, by a knot, glue, crimp, ultrasonic weld, or the like.

Figure 14E:
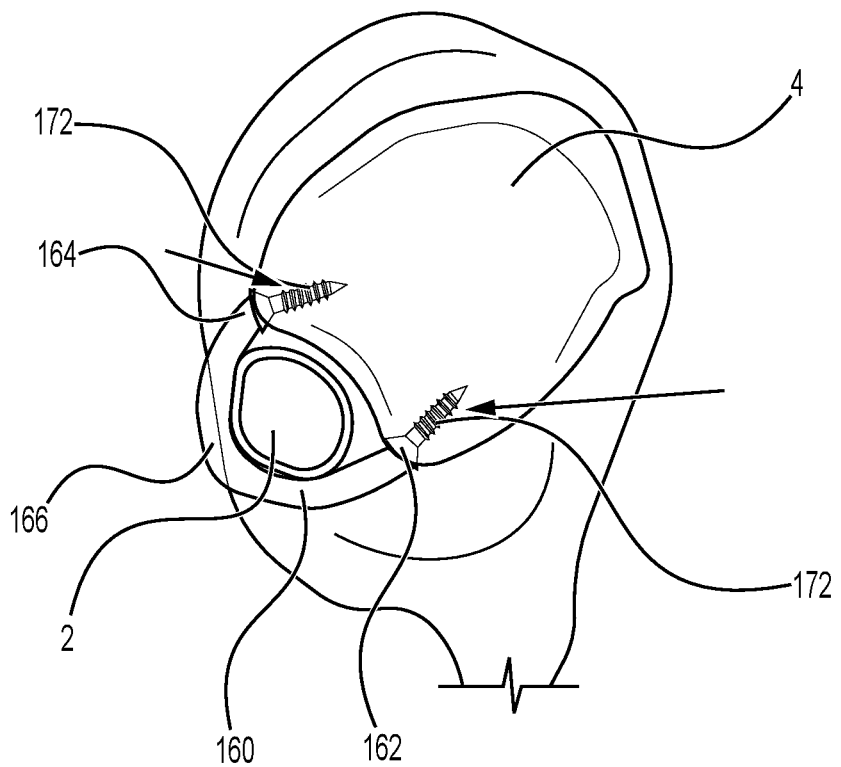
Figure 15A:
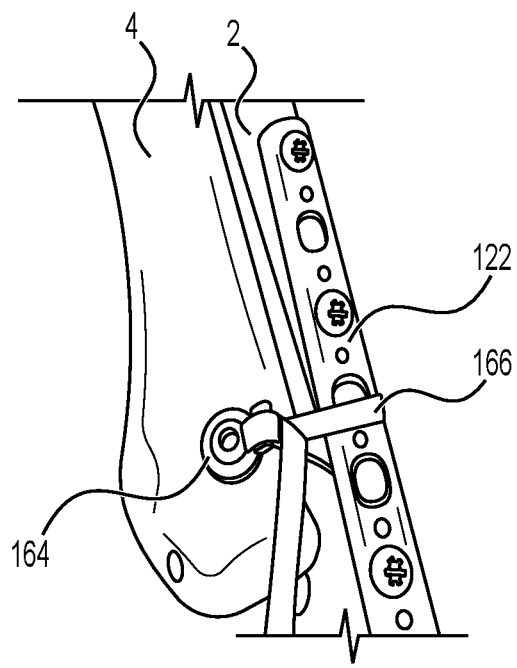
FIGS. 15A-15B shows examples of the suture placed around a bone plate and directly onto the bone.

FIG. 14E depicts an axial view of an ankle joint stabilized with the stabilization system 160. The static washer 200 may be placed on the posterior side of the tibia 4 and secured with a first anchor 172. The buckle washer 170 may be placed on the anterior side of the tibia 4 and secured with a second anchor 172. The suture 166 may be secured to the static washer 200, wrapped around the fibula 2, and attached to the buckle 176 of the buckle washer 170. The suture 166 may be tensioned by pulling on the free end 168 of the suture 166 to stabilize the joint.

Figure 15B:
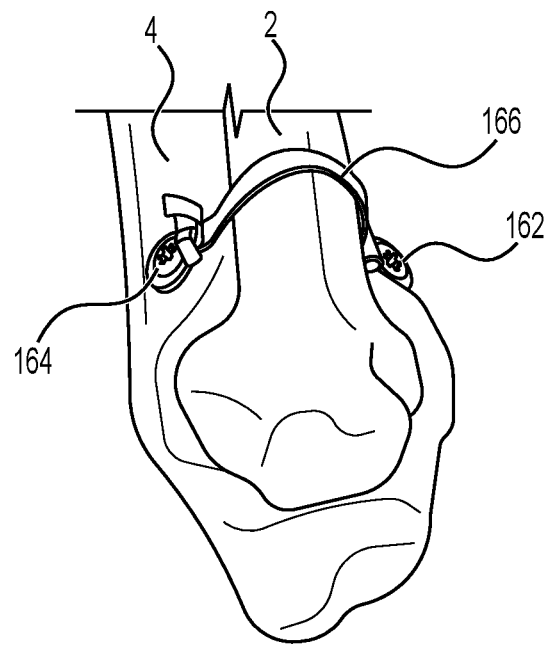

As shown in FIG. 15A, the suture 166 may be wrapped around, above, and against a fibula plate 122 (e.g., pre-existing from a prior surgery). It will be appreciated that the suture 166 may also go below a bone plate as well. In FIG. 15B, the tensioned suture 166 is shown wrapped around the bare fibula 2. Unlike injuries treated with screws or suture button systems, which are placed through the fibula and into the syndesmosis, the stabiliztion system 160 does not go through the fibula 2. Instead, the stabilization system 160 attaches to the anterior and posterior sides of the tibia 4 and wraps around the fibula 2 with the suture 166 to hold the syndesmosis stable.

Figure 16A:
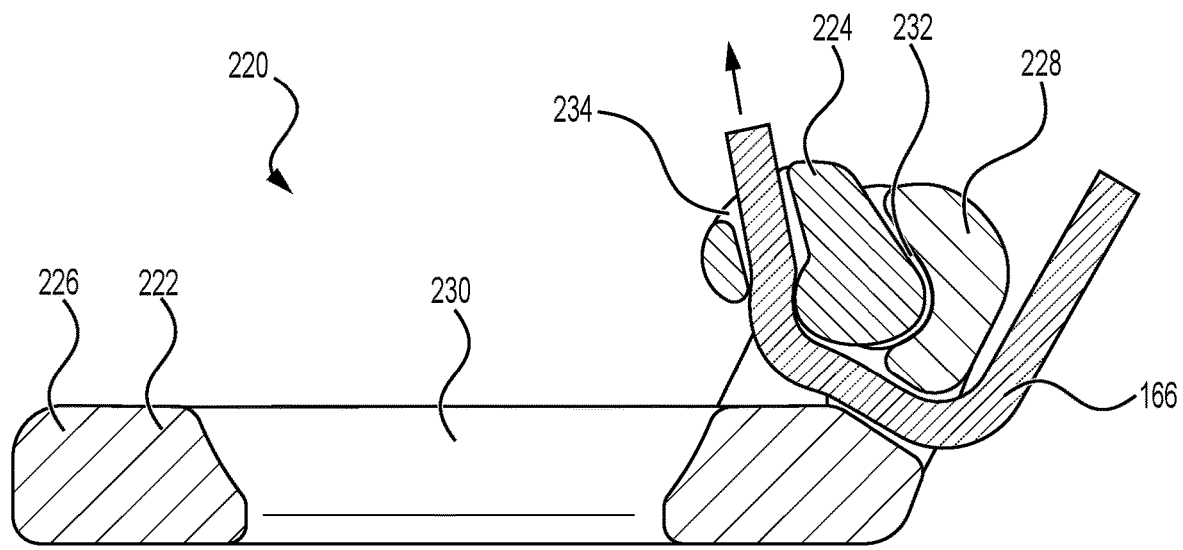
FIGS. 16A-16B show an embodiment of a tensioning anchor assembly with a moveable cam.
Figure 16B:
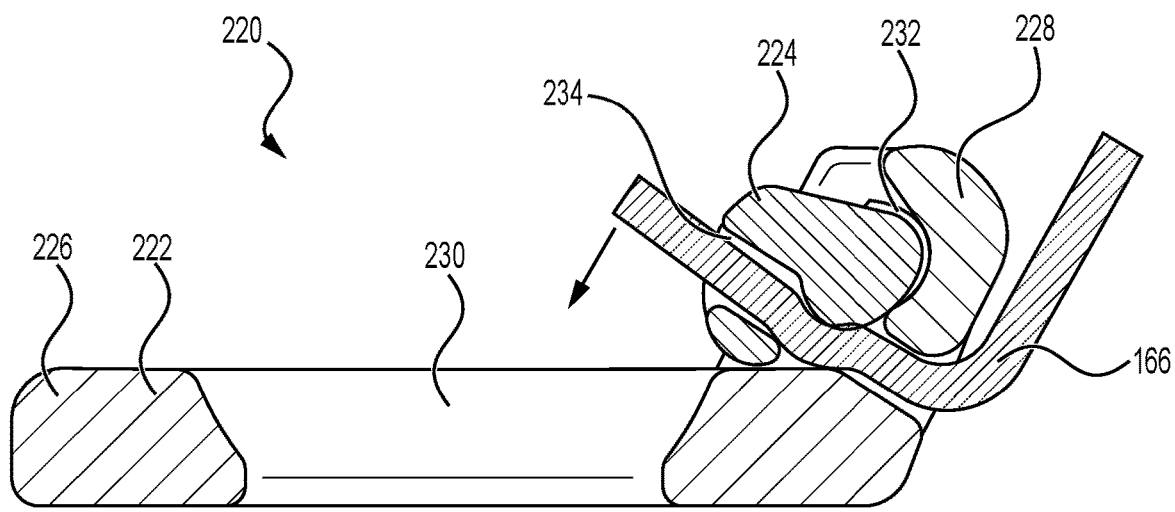

Turning to FIGS. 16A-16B, an embodiment of a tensioning anchor assembly 220 is shown. The tensioning anchor assembly 220 may include a cam washer 222, a moveable cam 224, and an anchor 172 positionable through the washer 222 for securing the assembly 220 to bone. The cam washer 222 may include a washer or ring 226 and a hollow hub or casing 228 protruding from one side of the ring 226. The washer or ring 226 may include a disk-shaped plate with a central hole 230 extending therethrough configured to retain the head 192 of the anchor 172.

The casing 228 is configured to house rotatable cam 224. The cam 224 may include a curved outer surface 232 configured to mate with a corresponding surface in the casing 228 that permits the cam to rotate 224. The cam 224 includes an opening 234 for receiving the suture 166 therethrough. The cam 224 may act as a one-way mechanism that allows the suture 166 to be pulled freely through the cam 224 if pulled vertically. FIG. 16A shows the cam 224 in a first position that allows free movement of the suture 166. Then, to hold the suture 166 at the desired tension, the suture 166 may be pulled down, towards the bottom of the washer 222. FIG. 16B shows the cam 224 in a second position that locks movement and maintains tension on the suture 166. When the suture 166 is pulled downward in this manner, the cam 224 pivots and presses the suture 166 into the body of the washer 222, crimping the suture 166, thereby holding the tension to the suture 166 via friction.

Figure 17A:
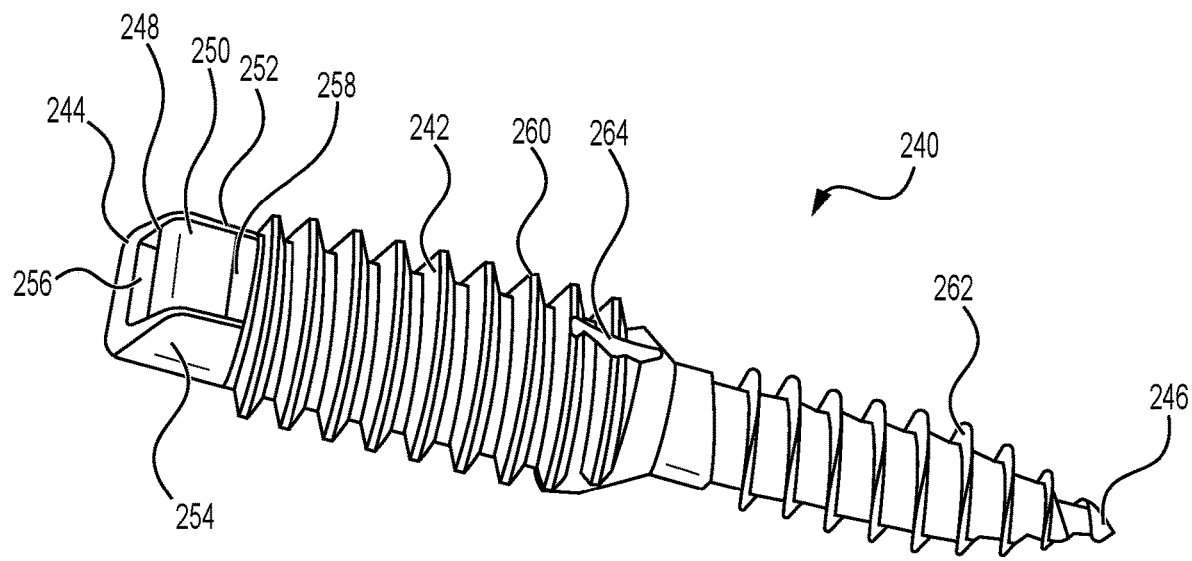
FIGS. 17A-17B show embodiments of integrated tensioning and static anchors, respectively.
Figure 17B:
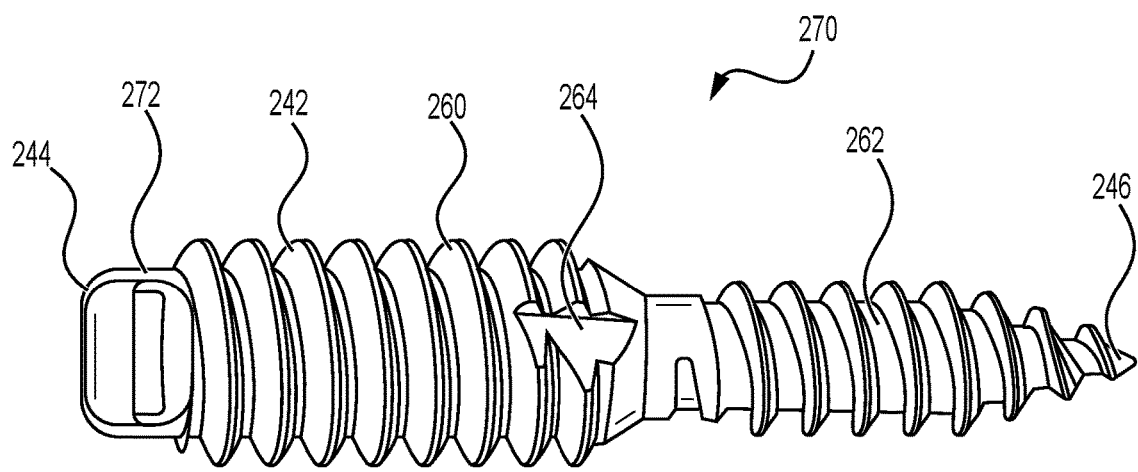

Referring now to FIGS. 17A-17B, embodiments of a tensioning anchor 240 and static anchor 270 are shown. The anchors 240, 270 may be placed sub-flush below the bone so that there is no implant prominence. The tensioning anchor 240 integrates the tensioning component into the anchor body. The anchor 240 may have a body 242 extending from a first proximal end 244 to a distal second 246 configured to be inserted into bone. The second end 246 may have a distal tip that is pointed, but may be configured to be blunt or otherwise configured to engage bone. The proximal end 244 may be headless with the buckle 248 integrated into the body 242 of the anchor 240.

Similar to buckle 30, buckle 248 may include a cross-member 250 positioned between side members 252, 254 of the body 242. The buckle 248 may define a first opening 256 and a second opening 258 on opposite sides of the cross-member 250.

The buckle 248 may be configured to retain and tension the suture 166. The suture 166 may be positioned through openings 256, 258 and wrapped around cross-member 250 in a manner suitable to loosen and/or tension the suture 166. Although buckle 248 is exemplified, it will be appreciated that the buckle 248 may include tension lock buckles, ladder lock buckles, ratcheting buckles, cam lock buckles, slide buckles, snap buckles, tie buckles, or any other suitable type of buckle.

The body 242 of the anchor 240 may include a first threaded portion 260 and a second threaded portion 262 with one or more threads along a portion or the entirety of the shaft. For example, the first threaded portion 260 may extend from the buckle 248 to a transition to the second threaded portion 262, and the second threaded portion 262 extends from the transition to the distal end 246 of the anchor 240. The first threaded portion 260 may have a greater outer diameter than the second threaded portion 262. The threads may have a suitable angle, lead, pitch, etc. to enhance insertion and/or engagement with the bone. Although threaded portions 260, 262 are exemplified in this embodiment, it will be appreciated that the threads could be substituted with ribs, teeth, friction surfaces, or other bone fixation mechanisms. The anchor body 242 may also include one or more flutes 264, which direct bone fragments away from the anchor body 242 during insertion.

In the embodiment shown in FIG. 17B, the anchor 270 is a static anchor. Static anchor 270 is the same as tensioning anchor 240 except the buckle 248 is replaced with a single loop 272. The static anchor 270 has one loop 272 that the suture 166 is wrapped around and affixed to. The suture 166 may be rigidly attached to itself or the anchor 270, for example, by a knot, glue, crimp, ultrasonic weld, or the like.

The stabilization systems described herein act as a fibula sling to aid in anatomic reduction and/or for fixation of syndesmosis disruptions. The suture is wrapped around the fibula and tensioned to support the fibula. The suture is anchored at both ends to the tibia. The fibula sling systems eliminate the need to drill any holes through the fibula, thereby minimizing the likelihood of stress fractures in the fibula, lessening irritation and pain, and/or reducing the chance for degenerative ankle issues for the patient.

Although the invention has been described in detail and with reference to specific embodiments, it will be apparent to one skilled in the art that various changes and modifications can be made without departing from the spirit and scope of the invention. Thus, it is intended that the invention covers the modifications and variations of this invention provided they come within the scope of the appended claims and their equivalents. It is expressly intended, for example, that all components of the various devices disclosed above may be combined or modified in any suitable configuration.

What is claimed is:

1. An implant for stabilizing a joint between a tibia and a fibula, the implant comprising:
a first anchor configured to be inserted into a posterior aspect of the tibia, the first anchor including a cannulated body having a channel extending from a first end of the cannulated body to a second end of the cannulated body, wherein the first end includes a recess configured to receive and engage a cannulated driver instrument having a handle and a central longitudinal suture channel in communication with the channel of the cannulated body, wherein the second end includes an integrated distal tip that is rounded and blunt and the second end includes a first buckle having a first opening and a second opening, wherein the second opening is in fluid communication with the recess via the channel;
a second anchor configured to be inserted into an anterior aspect of the tibia; and
a suture extending from a first end to a second end and configured to wrap around the fibula, the first end of the suture securable by the first anchor and the second end of the suture securable by the second anchor, wherein the suture is tensioned by the cannulated driver instrument to provide a circumferential force around the fibula, thereby stabilizing the joint, the suture configured to pass through the central longitudinal suture channel of the cannulated driver instrument and the channel of the cannulated body,
wherein the second anchor includes an assembly including a washer with an integrated buckle and a bone screw configured to be positioned through the washer,
wherein the first opening and the second opening are longitudinally spaced apart from one another in a longitudinal axis of the first anchor,
wherein the first opening and second opening are separated by an extension of the first anchor, and
wherein the first opening and the second opening receive the suture through the cannulated body of the first anchor,
wherein the integrated buckle protrudes at an angle from a plane of the washer, and
wherein the integrated buckle includes a cross-member positioned between two side members and an upper member above the cross-member such that a third opening and a fourth opening are on opposite sides of the cross-member, and wherein the side members extend obliquely from the plane of the washer.

2. The implant of claim 1, wherein the first anchor is a static anchor.

3. The implant of claim 1, wherein the second anchor is a tensioning anchor.

4. The implant of claim 3, wherein the second anchor includes a cannulated body extending from a proximal end to a distal end, wherein the distal end includes a second buckle configured to secure and tension the suture.

5. The implant of claim 4, wherein the second buckle is integrated with the body of the second anchor and includes a cross-member positioned between opposing side members, wherein the second buckle defines a first opening and a second opening on opposite sides of the cross-member.

6. The implant of claim 1, wherein the first anchor has a threaded portion and non-threaded portion, the non-threaded portion includes the first buckle.

7. An implant system for stabilizing a joint between a tibia and a fibula, the implant system comprising:
a cannulated driver instrument having a handle and a through opening defining a central longitudinal suture channel;
a first anchor configured to be inserted into one side of the tibia, the first anchor including a cannulated body having a channel extending from a first end to a second end, wherein the first end includes a recess configured to receive and engage a distal end of the cannulated driver instrument, wherein the second end includes a first buckle having a first opening and a second opening longitudinally separated from each other, wherein the channel of the cannulated body and the recess are in fluid communication with the central longitudinal suture channel while the cannulated driver instrument is engaged with a drive feature of the cannulated body;
a second anchor configured to be inserted into another side of the tibia, wherein the second anchor includes an assembly including a washer with an integrated buckle and a bone screw configured to be positioned through the washer, wherein the integrated buckle includes a cross-member positioned between two side members and an upper member above the cross-member such that a third opening and a fourth opening are on opposite sides of the cross-member, and wherein the side members extend obliquely from a plane of the washer; and a suture extending from a first end to a second end and configured to wrap around the fibula, the first end of the suture securable by the first anchor and the second end of the suture securable by the second anchor, wherein the suture is tensioned by the cannulated driver instrument to provide a circumferential force around the fibula, thereby stabilizing the joint, and the suture is configured to pass through the central longitudinal suture channel of the cannulated driver instrument and the channel of the cannulated body while the first anchor is being inserted into the tibia, wherein the first opening and the second opening receive the suture through the cannulated body of the first anchor.

8. The implant system of claim 7, wherein the first anchor is a static anchor.

9. The implant system of claim 7, wherein the second anchor is a tensioning anchor.

10. The implant system of claim 9, wherein the second anchor includes a cannulated body extending from a proximal end to a distal end, wherein the distal end includes a second buckle configured to secure and tension the suture.

11. The implant system of claim 10, wherein the second buckle is integrated with the body of the second anchor and includes a cross-member positioned between opposing side members, wherein the second buckle defines a first opening and a second opening on opposite sides of the cross-member.

12. The implant system of claim 7, wherein the first anchor has a threaded portion and non-threaded portion, the non-threaded portion includes the first buckle.

* * * * *